US012646350B2

(12) United States Patent
Jeong et al.

(10) Patent No.: US 12,646,350 B2
(45) Date of Patent: Jun. 2, 2026

(54) DISPLAY APPARATUS

(71) Applicant: SAMSUNG DISPLAY CO., LTD.,
Yongin-si (KR)

(72) Inventors: Joohyeon Jeong, Yongin-si (KR);
Yongsub So, Yongin-si (KR);
Keumdong Jung, Yongin-si (KR)

(73) Assignee: SAMSUNG DISPLAY CO., LTD.,
Yongin-si (KR)

( * ) Notice: Subject to any disclaimer, the term of this
patent is extended or adjusted under 35
U.S.C. 154(b) by 0 days.

(21) Appl. No.: 18/917,715

(22) Filed: Oct. 16, 2024

(65) Prior Publication Data

US 2025/0182520 A1 Jun. 5, 2025

(30) Foreign Application Priority Data

Dec. 1, 2023 (KR) ........................ 10-2023-0172735

(51) Int. Cl.
*G06V 40/13* (2022.01)
*G06F 3/044* (2006.01)
(52) U.S. Cl.
CPC ........ *G06V 40/1318* (2022.01); *G06F 3/0445*
(2019.05)
(58) Field of Classification Search
CPC ........... G06V 40/1318; G06V 40/1306; G06V
40/13; G06F 3/0445; G06F 2203/04111;
G06F 3/0412; G06F 3/04166; G06F
3/0443; G06F 3/0446; G06F 3/0416;
G06F 3/044; G06F 3/047; G09G 3/3208
See application file for complete search history.

(56) References Cited

U.S. PATENT DOCUMENTS

| | | | |
|---|---|---|---|
| 10,444,882 B2 | 10/2019 | Jung | |
| 10,762,819 B2 | 9/2020 | Shin | |
| 2018/0150168 A1* | 5/2018 | Jung | ........................ H03M 1/12 |
| 2022/0067340 A1* | 3/2022 | Han | .................... H10K 59/122 |
| 2023/0350512 A1 | 11/2023 | Jung et al. | |

FOREIGN PATENT DOCUMENTS

| | | |
|---|---|---|
| KR | 10-2016-0093750 A | 8/2016 |
| KR | 10-2018-0062582 A | 6/2018 |
| KR | 10-2019-0073632 A | 6/2019 |
| KR | 10-2023-0155062 A | 11/2023 |

* cited by examiner

*Primary Examiner* — Abhishek Sarma
(74) *Attorney, Agent, or Firm* — F. CHAU &
ASSOCIATES, LLC

(57) ABSTRACT

A display apparatus includes a fingerprint sensor that
includes first sensing electrodes and second sensing elec-
trodes, a touch sensor that includes third sensing electrodes
and fourth sensing electrodes, a fingerprint sensor driver that
transmits a first driving signal to the fingerprint sensor and
receives a first sensing signal from the fingerprint sensor, a
touch sensor driver that transmits a second driving signal to
the touch sensor and receives a second sensing signal from
the touch sensor, and a controller that generates a vertical
blank signal that has an on-voltage during a vertical blank
period and transmits the vertical blank signal to the finger-
print sensor driver. During an on-voltage period of the
vertical blank signal, the fingerprint sensor driver drives the
fingerprint sensor once.

20 Claims, 20 Drawing Sheets

FIG. 9

TDV: 42, 43
FDV: 48, 49

DISPLAY APPARATUS

CROSS-REFERENCE TO RELATED APPLICATION

This application claims priority under 35 U.S.C. § 119 from Korean Patent Application No. 10-2023-0172735, filed on Dec. 1, 2023 in the Korean Intellectual Property Office, the contents of which are herein incorporated by reference in their entirety.

TECHNICAL FIELD

One or more embodiments are directed to a display apparatus.

DISCUSSION OF THE RELATED ART

Recently, the usage of display apparatuses has diversified. In addition, as display apparatuses have become thinner and lighter, their range of use has been gradually extended.

A display apparatus may include a touch sensing apparatus as an input unit. The touch sensing apparatus includes a touch sensor and a touch sensor driving circuit that drives the touch sensor and generates touch data.

In addition, a display apparatus may include a fingerprint sensing apparatus that receives a user's fingerprints as an input unit. The fingerprint sensing apparatus includes a fingerprint sensor provided on the front surface of the display apparatus, and a fingerprint sensor driving circuit that drives the fingerprint sensor and generates fingerprint data.

SUMMARY

One or more embodiments include a display apparatus that includes a fingerprint sensing apparatus with increased fingerprint sensing performance.

According to one or more embodiments, a display apparatus includes a fingerprint sensor disposed in a first area and that includes a plurality of first sensing electrodes and a plurality of second sensing electrodes, a touch sensor disposed in a second area that surrounds the first area, where the touch sensor includes a plurality of third sensing electrodes and a plurality of fourth sensing electrodes, a fingerprint sensor driver that transmits a first driving signal to the fingerprint sensor and receives a first sensing signal from the fingerprint sensor, a touch sensor driver that transmits a second driving signal to the touch sensor and receives a second sensing signal from the touch sensor, and a controller that generates a vertical blank signal that has an on-voltage during a vertical blank period and transmits the vertical blank signal to the fingerprint sensor driver. During an on-voltage period of the vertical blank signal, the fingerprint sensor driver drives the fingerprint sensor once.

The display apparatus may further include a plurality of signal lines that connect the fingerprint sensor to the fingerprint sensor driver. The plurality of first sensing electrodes, the plurality of third sensing electrodes, and the plurality of fourth sensing electrodes may be disposed on a different layer from the plurality of signal lines.

Third sensing electrodes of the plurality of third sensing electrodes that are adjacent to each other in a first direction may be connected to each other by a bridge pattern. The bridge pattern may be disposed on a same layer as the plurality of signal lines, and the plurality of signal lines may detour around the bridge pattern.

The plurality of signal lines may overlap the plurality of third sensing electrodes and the plurality of fourth sensing electrodes.

The display apparatus may further include a plurality of pixels disposed below the fingerprint sensor and the touch sensor, and the plurality of signal lines may overlap the plurality of pixels.

The touch sensor driver further generates jitter data from the second sensing signal and transmits the jitter data to the controller, and the controller further determines from the jitter data whether noise is within a reference range, transmits a first control signal to the fingerprint sensor driver when the noise is within the reference range, and transmits a second control signal to the fingerprint sensor driver when the noise deviates from the reference range.

When receiving the first control signal, the fingerprint sensor driver may drive the fingerprint sensor at least once during an off-voltage period of the vertical blank signal, and when receiving the second control signal, the fingerprint sensor driver may maintain the fingerprint sensor in an idle state during the off-voltage period of the vertical blank signal.

When receiving the first control signal, the fingerprint sensor driver may operate at a first report rate, and when receiving the second control signal, the fingerprint sensor driver may operate at a second report rate, and the first report rate may be greater than the second report rate.

The first report rate may be twice the second report rate.

The first report rate may be three times the second report rate.

The plurality of first sensing electrodes and the plurality of second sensing electrodes may be disposed on different layers from each other.

Each of the plurality of first sensing electrodes may extend in a first direction, and each of the plurality of second sensing electrodes may extend in a second direction that crosses the first direction.

The display apparatus may further include a plurality of first signal lines that connect the plurality of first sensing electrodes to the fingerprint sensor driver, and a plurality of second signal lines that connect the plurality of second sensing electrodes to the fingerprint sensor driver. The plurality of first signal lines and the plurality of second signal lines may be disposed on a same layer as the plurality of second sensing electrodes.

Each of the plurality of second signal lines may be integrally formed with a corresponding one of the plurality of second sensing electrodes.

According to one or more embodiments, a display apparatus includes a fingerprint sensor disposed in a first area and that includes a plurality of first sensing electrodes and a plurality of second sensing electrodes, a touch sensor disposed in a second area that surrounds the first area, where the touch sensor includes a plurality of third sensing electrodes and a plurality of fourth sensing electrodes, a fingerprint sensor driver that transmits a first driving signal to the fingerprint sensor and receives a first sensing signal from the fingerprint sensor, a touch sensor driver that transmits a second driving signal to the touch sensor and receives a second sensing signal from the touch sensor, and a controller that generates a vertical blank signal that has an on-voltage during a vertical blank period and transmits the vertical blank signal to the fingerprint sensor driver. An off-voltage period of the vertical blank signal coincides with a first fingerprint driving period and a second fingerprint driving period, an on-voltage period of the vertical blank signal coincides with a third fingerprint driving period, and the fingerprint sensor driver drives the fingerprint sensor once for each of the first fingerprint driving period, the second fingerprint driving period, and the third fingerprint driving period.

A report rate of the fingerprint sensor driver may be about 360 Hz.

The display apparatus may further include a plurality of pixels disposed below the fingerprint sensor and the touch sensor, and a display driver that controls light emission of the plurality of pixels. When a frame rate of the display driver is a first value, a report rate of the fingerprint sensor driver may be a second value that is three times the first value.

The display apparatus may further include a plurality of signal lines that connect the fingerprint sensor to the fingerprint sensor driver. The plurality of signal lines may be included in a first conductive layer, and the plurality of first sensing electrodes, the plurality of third sensing electrodes, and the plurality of fourth sensing electrodes may be included in a second conductive layer disposed on the first conductive layer.

The first conductive layer may include a bridge pattern that connects third sensing electrodes of the plurality of third sensing electrodes that are adjacent to each other in a first direction. The plurality of signal lines detour around the bridge pattern.

The plurality of second sensing electrodes may be included in the first conductive layer.

BRIEF DESCRIPTION OF THE DRAWINGS

FIG. 9 illustrates a portion of the display apparatus shown in FIG. 8.

DETAILED DESCRIPTION

Figure 1:
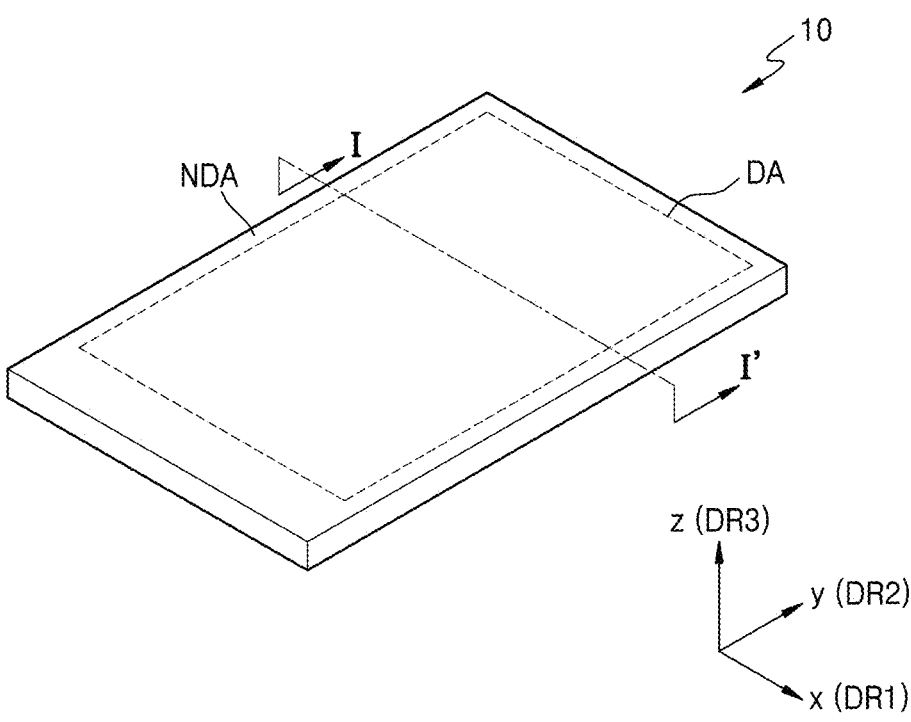
FIG. 1 is a perspective view of a display panel according to an embodiment.

Reference will now be made in detail to embodiments, examples of which are illustrated in the accompanying drawings, wherein like reference numerals may refer to like elements throughout and a repeated description thereof is omitted. In this regard, the present embodiments may have different forms and should not be construed as being limited to the descriptions set forth herein It will be further understood that, when a layer, region, or component is referred to as being "on" another layer, region, or component, it can be directly or indirectly on the other layer, region, or component.

It will be understood that when a layer, region, or component is referred to as being "connected" to another layer, region, or component, it may be "directly connected" to the other layer, region, or component or may be "indirectly connected" to the other layer, region, or component with other layer, region, or component interposed therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

In the case where a certain embodiment may be implemented differently, a specific process order may be performed in an order different from the described order.

In the present specification, when a wiring is referred to as "extending in a first direction or a second direction", it means that the wiring not only extends in a straight line shape but also extends in a zigzag or in a curve in the first direction or the second direction.

In the present specification, "in plan view" means when the subject matter is viewed in a direction approximately perpendicular to the front surface of the substrate, and "in cross-section view" means when the subject matter is viewed from the side in a vertically cut section.

In the present specification, when it is referred that a first element "overlaps" a second element, it means that the first element is arranged above or below the second element.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor may be activated by a low-level voltage, and an N-channel transistor may be activated by a high-level voltage. Accordingly, it should be understood that on-voltages of the P-channel transistor (P-type transistor) and the N-channel transistor (N-type transistor) are opposite (low versus high) voltage levels.

Figure 2:
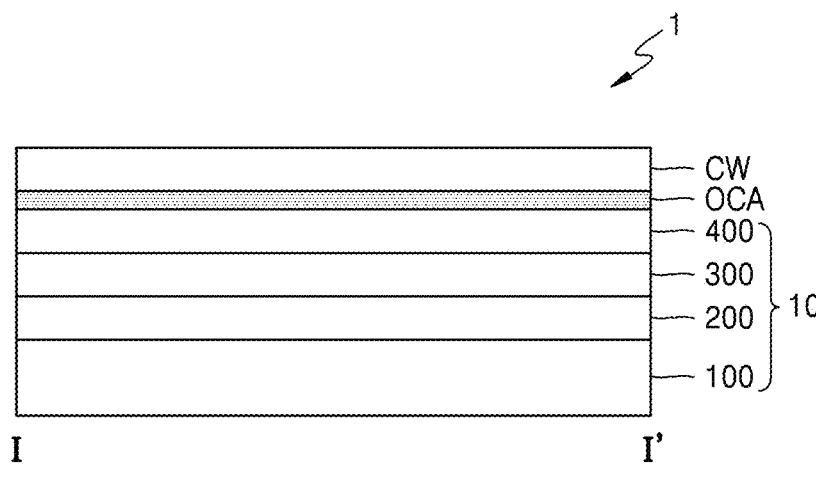
FIG. 2 is a schematic cross-sectional view of the display panel of FIG. 1, taken along line I-I' of FIG. 1.
Figure 2:
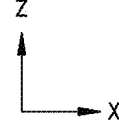

FIG. 1 is a perspective view of a display panel 10 according to an embodiment, and FIG. 2 is a schematic cross-sectional view of the display panel 10 of FIG. 1, taken along line I-I' of FIG. 1.

Referring to FIG. 1, in an embodiment, a display apparatus includes a display panel 10. The display panel 10 includes a display area DA and a non-display area NDA outside the display area DA. The display panel 10 displays images by using light emitted from a plurality of pixels arranged in the display area DA. The non-display area NDA is arranged around the display area DA and is a region in which no pixels are arranged. The display area DA is entirely surrounded by the non-display area NDA. Various wirings that transmit electric signals to the display area DA and pads to which a printed circuit board or a driver integrated circuit (IC) chip is attached is located in the non-display area NDA.

Referring to FIG. 2, in an embodiment, a display apparatus 1 includes the display panel 10 that includes a substrate 100, a display layer 200, an encapsulation layer 300, and a touch sensor layer 400.

The substrate 100 includes an insulating material such as at least one of glass, quartz, a polymer resin, etc. The substrate 100 may be a rigid substrate or a flexible substrate that is bendable, foldable, or rollable. For example, the substrate 100 includes a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may have a multi-layered structure that includes a base layer that includes the polymer resin and an inorganic layer. For example, the substrate 100 includes two base layers that include a polymer resin, and an inorganic barrier layer therebetween.

The display layer 200 is disposed on the substrate 100. The display layer 200 includes pixels and displays images. The display layer 200 includes display elements and pixel circuits electrically connected to the display elements. In addition, the display layer 200 includes scan lines, data lines, and power lines connected to the pixel circuits. The display layer 200 also includes a scan driver, and fan-out lines, where the scan driver transmits scan signals to the scan lines, and the fan-out lines connect the data lines to a data driver.

The display element includes an emission layer. The emission layer of the display element includes an organic material, an inorganic material, quantum dots, an organic material and quantum dots, an inorganic material and quantum dots, or a combination of an organic material, an inorganic material, and quantum dots. In an embodiment, the display element is an organic light-emitting diode.

The encapsulation layer 300 encapsulates the display element and is disposed on the display layer 200. The encapsulation layer 300 includes at least one organic encapsulation layer that provides a planarized base surface for the touch sensor layer 400. Accordingly, even when the touch sensor layer 400 is formed by a continuous process, a defect rate is reduced.

The touch sensor layer 400 is disposed on the encapsulation layer 300. The touch sensor layer 400 includes a touch sensor, a fingerprint sensor, and signal lines. The display apparatus 1 obtains a user's fingerprint data by measuring an amount of change in the capacitance of sensing electrodes that form the fingerprint sensor. The display apparatus 1 obtains whether a user has entered a touch and the location of the touch by measuring the amount of change in the capacitance of the sensing electrodes that form the touch sensor.

The touch sensor layer 400 is formed by a continuous process like that of the encapsulation layer 300. For example, the touch sensor layer 400 is directly formed on the base surface of the encapsulation layer 300.

The display apparatus 1 further includes a cover window CW disposed over the display panel 10. The cover window CW protects the upper surface of the display panel 10. The cover window CW is attached to the display panel 10 using an optically transparent adhesive OCA or an optically transparent resin.

In an embodiment, at least one functional layer is disposed between the touch sensor layer 400 and the cover window CW. The functional layer may perform one or more of color filtering function, a color converting function, and a polarizing function, etc. The functional layer may be a sheet layer that includes a sheet, a film layer that includes a film, a thin-film layer, a coating layer, a panel, or a plate, etc. One functional layer may include a single layer or include a plurality of stacked thin films or coating layers. For example, the functional layer is one of a color filter, an optical filter, and an optical film, etc.

Figure 3:
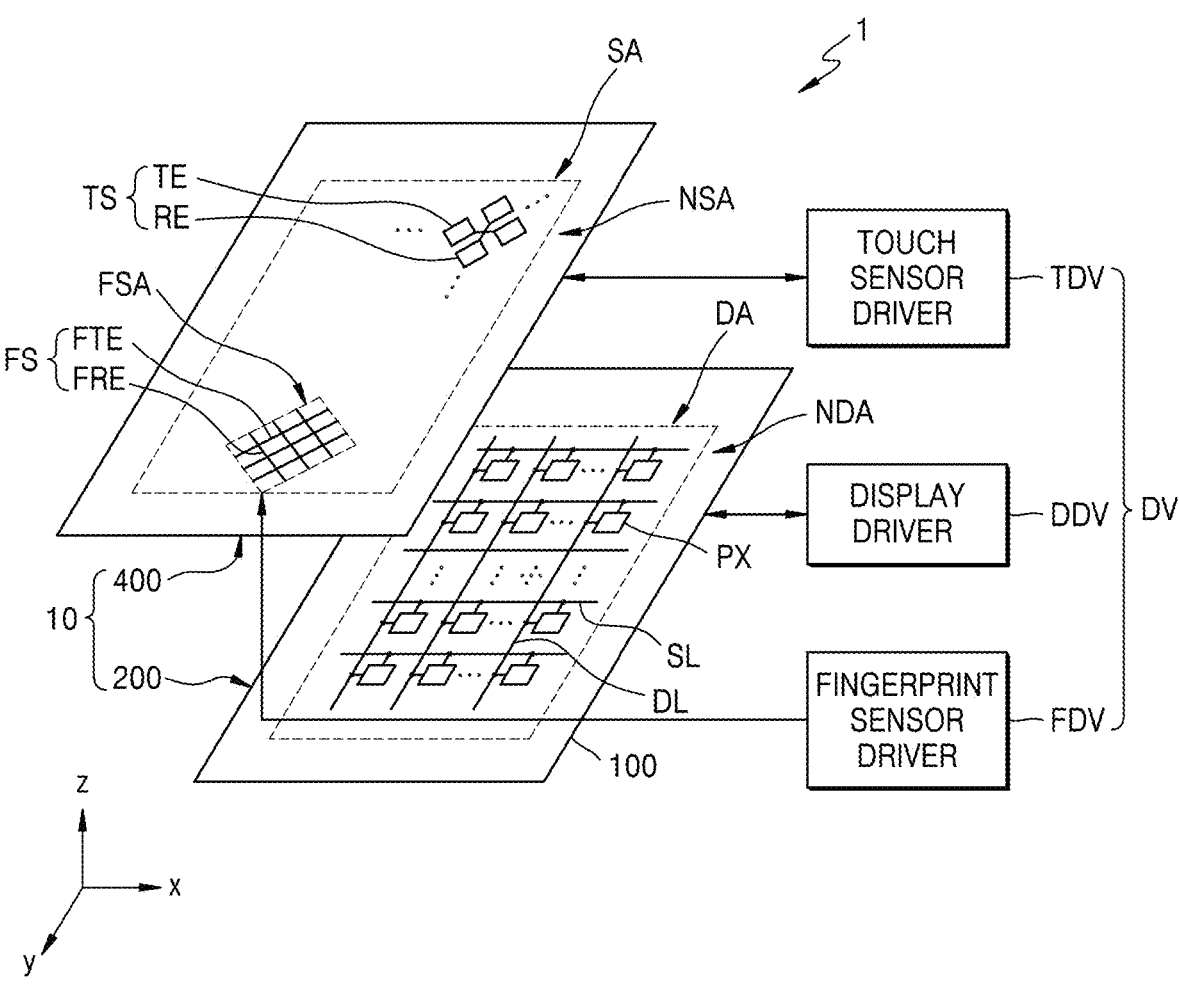
FIG. 3 is a schematic view of a display apparatus according to an embodiment.

FIG. 3 is a schematic view of the display apparatus 1 according to an embodiment.

Referring to FIG. 3, and further referring to FIG. 1, in an embodiment, the display apparatus 1 includes the display panel 10 and a driving circuit portion DV that drives the display panel 10.

The display panel 10 includes the display layer 200 disposed on the substrate 100, and the touch sensor layer 400 disposed over the display layer 200. The encapsulation layer 300 (see FIG. 2) is disposed between the display layer 200 and the touch sensor layer 400.

The display layer 200 includes pixels PX, and wirings and pads electrically connected to the pixels PX. The display area DA is an area where the plurality of pixels PX are disposed. The display layer 200 displays images using light emitted from the plurality of pixels PX arranged in the display area DA. The non-display area NDA is arranged around the display area DA. Various wirings and pads are disposed in the non-display area NDA.

Each of the pixels PX includes a display element such as an organic light-emitting diode, and a pixel circuit that controls the display element. The pixel circuit includes a transistor, a storage capacitor, etc.

The pixel circuit is electrically connected to a scan line SL that extends in a first direction DR1 (an x direction) and a data line DL, etc., that extend in a second direction DR2 (a y direction). The pixel circuit controls the display element according to a data signal received through the data line DL, and a scan signal received through the scan line SL. In an embodiment, each of the pixels PX emits one of red, green, or blue light. In an embodiment, each of the pixels PX emits one of red, green, blue, or white light.

The touch sensor layer 400 includes a fingerprint sensor FS, a touch sensor TS, and signal lines. A fingerprint sensing area FSA is an area where sensing electrodes of the fingerprint sensor FS are arranged. The fingerprint sensor FS obtains a user's fingerprint information by measuring a capacitance change amount of the sensing electrodes in the fingerprint sensing area FSA. A touch sensing area SA is an area where sensing electrodes of the touch sensor TS are arranged. The touch sensor TS obtains whether a user has entered a touch and the location of the touch by measuring the capacitance change amount of the sensing electrodes in the touch sensing area SA.

The fingerprint sensing area FSA is entirely surrounded by the touch sensing area SA. A non-sensing area NSA is arranged around the touch sensing area SA. The touch sensing area SA is entirely surrounded by the non-sensing area NSA. Wirings that are electrically connected to the fingerprint sensor FS and the touch sensor TS are disposed in the non-sensing area NSA.

In a plan view, the touch sensing area SA and the fingerprint sensing area FSA overlap the display area DA.

Accordingly, the pixels PX are disposed below the touch sensor TS and the fingerprint sensor FS.

The fingerprint sensor FS includes first driving electrodes FTE (first sensing electrodes) and first sensing electrodes FRE (second sensing electrodes). The first driving electrodes FTE and the first sensing electrodes FRE extend in different directions from each other and cross each other and form a mesh structure in a plan view.

The touch sensor TS includes second driving electrodes TE (third sensing electrodes), second sensing electrodes RE (fourth sensing electrodes), and bridge patterns. Second driving electrodes TE that are adjacent to each other in the first direction (the x direction) are electrically connected to each other through a first bridge pattern, and second sensing electrodes RE that are adjacent to each other in the second direction (the y direction) are electrically connected to each other through a second bridge pattern.

The driving circuit portion DV includes a display driver DDV, a fingerprint sensor driver FDV, and a touch sensor driver TDV. In an embodiment, the driving circuit portion DV includes a single touch display driver integration (TDDI) chip. In an embodiment, the driving circuit portion DV includes a plurality of integrated circuits.

The display driver DDV drives the plurality of pixels PX. For example, the display driver DDV transmits electrical signals that control the brightness of each of the pixels PX.

The fingerprint sensor driver FDV drives the fingerprint sensor FS of the touch sensor layer 400. The fingerprint sensor driver FDV transmits a fingerprint driving signal to the fingerprint sensor FS, receives a fingerprint sensing signal that corresponds to a fingerprint driving signal from the fingerprint sensor FS, and converts the fingerprint sensing signal into fingerprint data, which is digital data.

The touch sensor driver TDV drives the touch sensor TS of the touch sensor layer 400. The touch sensor driver TDV transmits a touch driving signal to the touch sensor TS, receives a touch sensing signal that corresponds to a touch driving signal from the touch sensor TS, and converts the touch sensing signal into touch data, which is digital data.

In an embodiment, the touch sensor driver TDV and the fingerprint sensor driver FDV include the same sensor integrated chip (IC). In an embodiment, the touch sensor driver TDV and the fingerprint sensor driver FDV include separate ICs.

The display apparatus 1 can operate in a fingerprint sensing mode or a touch sensing mode. When the display apparatus 1 operates in a fingerprint sensing mode that obtains a user's fingerprint information from the fingerprint sensing area FSA, the fingerprint sensor driver FDV drives the fingerprint sensor FS to obtain a user's fingerprint data from the fingerprint sensing areas FSA, and the touch sensor driver TDV drives the touch sensor TS to obtain a user's touch data from the touch sensing area SA.

When the display apparatus 1 operates in a touch sensing mode that senses whether a user touch has occurred and the position of the touch in the touch sensing area SA, the touch sensor driver TDV drives the touch sensor TS to obtain a user's touch data. When the display apparatus 1 operates in touch sensing mode, when a user inputs a touch in the fingerprint sensing area FSA, the touch sensor driver TDV senses whether a user has input a touch and the position of the touch based on the capacitance change amount of the second driving electrode TE and the second sensing electrode RE adjacent to the fingerprint sensing areas FSA.

Figure 4:
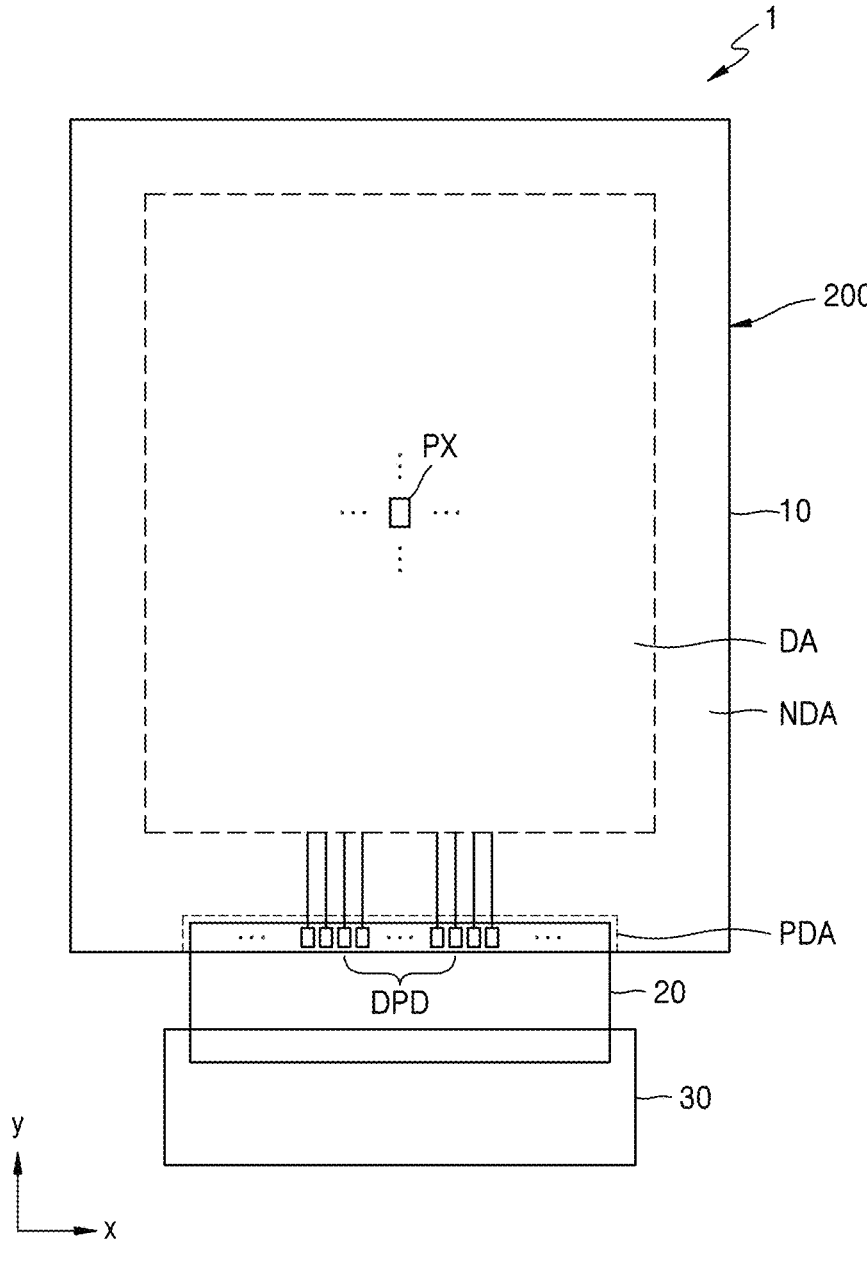
FIG. 4 is a schematic plan view of a display apparatus according to an embodiment.

FIG. 4 is a schematic plan view of the display apparatus 1 according to an embodiment.

Referring to FIG. 4, in an embodiment, the display apparatus 1 includes a display panel 10, a connection member 20, and a circuit board 30. FIG. 4 schematically shows the display layer 200 of the display panel 10.

The display panel 10 includes the display area DA in which the plurality of pixels PX are arranged, and the non-display area NDA around the display area DA. The non-display area NDA includes a pad area PDA.

Display pads DPD are disposed in the pad area PDA, and the display pads DPD are electrically connected to the display driver DDV (see FIG. 3) through the connection member 20. The display pads DPD are electrically connected to the pixels PX through wirings. Electrical signals provided by the display driver DDV are transmitted to the pixels PX through the display pads DPD.

The connection member 20 connects the display panel 10 to the circuit board 30. For example, one end of the connection member 20 is connected (or attached) to the pad area PDA of the display panel 10, and another end of the connection member 20 is connected (or attached) to the circuit board 30. The connection member 20 includes a plurality of wirings and/or a circuit on an insulating film such as polyimide, etc. In an embodiment, the connection member 20 is provided as a chip-on-film, and an IC chip that forms at least a portion of the driving circuit portion DV (see FIG. 3) is mounted on the connection member 20.

The circuit board 30 is a flexible printed circuit board. The circuit board 30 is connected to one end of the connection member 20 and is disposed on the back side of the display panel 10. The circuit board 30 transmits electrical signals that are received from a host, an application processor, etc., to the driving circuit portion DV.

Although FIG. 4 shows that the display panel 10 includes the connection member 20, embodiments are not necessarily limited thereto. In an embodiment, the IC chip that forms at least a portion of the driving circuit portion DV is mounted on the display panel 10, and one end of the display panel 10 is directly connected (or attached) to the circuit board 30.

Figure 5:
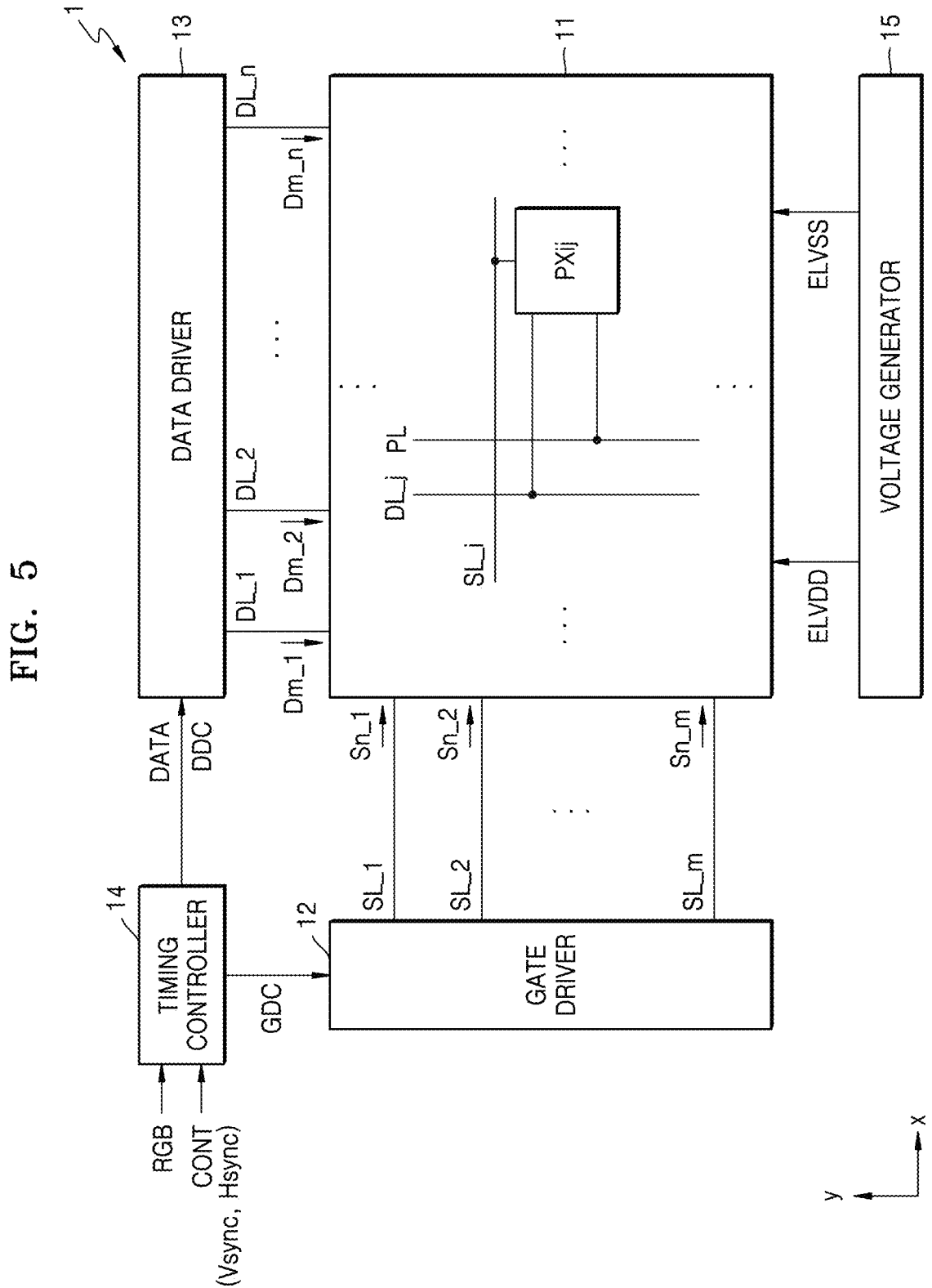
FIG. 5 is a schematic view of a display apparatus according to an embodiment.

FIG. 5 is a schematic view of the display apparatus 1 according to an embodiment. FIG. 5 illustrates operations of the display layer 200 (see FIG. 3) and the display driver DDV (see FIG. 3).

Referring to FIG. 5, and further referring to FIG. 4, in an embodiment, the display apparatus 1 includes a display 11, a gate driver 12, a data driver 13, a timing controller 14, and a voltage generator 15.

The display 11 includes the pixels PX such as a pixel $PX_{ij}$ positioned in an i-th row and a j-th column. For easy understanding, although FIG. 5 shows only one pixel $PX_{ij}$, m×n pixels PX are arranged, for example, in a matrix configuration. Here, i is an integer between 1 and m, and j is an integer between 1 and n.

For illustrative purposes, the description of FIG. 5 will focus on a pixel PX that uses a pixel circuit that includes two transistors and one capacitor. However, embodiments are not only apply to a pixel PX that uses a specific pixel circuit but also to a pixel PX that uses another pixel circuit, such as a pixel circuit that includes, for example, three transistors and one capacitor, and a pixel PX, etc., that uses a pixel circuit that includes seven transistors and one capacitor.

The pixels PX are connected to scan lines SL_1 to SL_m, data lines DL_1 to DL_n, and a power line PL. For example, a pixel $PX_{ij}$ positioned in an i-th row and a j-th column is connected to a scan line SL-i, a data line DL_j, and the power line PL.

Each of the data lines DL_1 to DL_n extend in the second direction (the y direction) and is connected to pixels PX arranged in the corresponding column. Each scan lines SL_1 to SL_m extend in the first direction (the x direction) and is connected to pixels PX arranged in the corresponding row.

The power line PL includes a plurality of vertical power lines that extend in the second direction (the y direction), and each of the plurality of vertical power lines are connected to pixels PX in the corresponding column.

Each of the scan lines SL_1 to SL_m transmits a corresponding one of the scan signals Sn_1 to Sn_m received from the gate driver 12 to the pixels PX in the same row. Each of the data lines DL_1 to DL_n transmits a corresponding one of the data signals Dm_1 to Dm_n received from the data driver 13 to the pixels PX in the same column. The pixel $PX_{ij}$ positioned in the i-th row and the j-th column receives a scan signal Sn_i and a data signal Dm_j.

The power line PL transmits a first driving voltage ELVDD generated by the voltage generator 15 to the pixels PX.

The pixel $PX_{ij}$ includes a display element and a driving transistor that controls the amount of current that flows through the display element based on a data signal Dm_j. A data signal Dm_j is output from the data driver 13 and received by the pixel $PX_{ij}$ through the data line DL_j. The display element is, for example, an organic light-emitting diode. Because the display element emits light at a brightness that corresponds to the amount of current received from the driving transistor, the pixel $PX_{ij}$ can express a grayscale that corresponds to the data signal Dm_j. The pixel PX corresponds to a portion of a unit pixel that displays full colors, such as a sub-pixel.

The voltage generator 15 generates voltages that drive the pixel $PX_{ij}$. For example, the voltage generator 15 generates the first driving voltage ELVDD and a second driving voltage ELVSS. A level of the first driving voltage ELVDD is greater than that of the second driving voltage ELVSS.

The voltage generator 15 generates an initialization voltage and transmits the same to the pixels PX. The initialization voltage is transmitted to a gate of the driving transistor and/or an anode of the display element.

In addition, the voltage generator 15 generates a turn-on voltage and a turn-off voltage that control a switching transistor of the pixel $PX_{ij}$ and transmits the turn-on voltage and the turn-off voltage to the gate driver 12. When the turn-on voltage is applied to a gate of the switching transistor, the switching transistor is turned on, and when the turn-off voltage is applied to the gate of the switching transistor, the switching transistor is turned off. The voltage generator 15 also generates gamma reference voltages and transmits the same to the data driver 13.

The timing controller 14 controls the display 11 by controlling operation timings of the gate driver 12 and the data driver 13. The pixels PX of the display 11 display an image that corresponds to image source data RGB of one frame by receiving a new data signal Dm and emitting light at a brightness that corresponds to the data signal Dm for each frame period.

The timing controller 14 receives image source data RGB and a control signal CONT from an external source. The timing controller 14 converts image source data RGB into image data DATA based on characteristics of the display 11 and the pixels PX. The timing controller 14 transmits image data DATA to the data driver 13.

The control signal CONT includes a vertical synchronization signal Vsync, a horizontal synchronization signal Hsync, a data enable signal, a clock signal, etc. The timing controller 14 controls operation timings of the gate driver 12 and the data driver 13 using the control signal CONT. The timing controller 14 determines a frame period by counting a data enable signal of a horizontal scanning period. Image source data RGB includes luminance information of the pixels PX. The luminance includes a set number of gray levels, such as 1024 ($=2^{10}$), 256 ($=2^8$), or 64 ($=2^6$).

The timing controller 14 generates control signals that include a gate timing control signal GDC that controls an operation timing of the gate driver 12 and a data timing control signal DDC that controls an operation timing of the data driver 13.

The gate timing control signal GDC includes a gate start pulse, a gate shift clock, a gate output enable signal, etc. The gate start pulse is transmitted to the gate driver 12 that generates a first scan signal at a start point of a scanning period. The gate shift clock is commonly transmitted to the gate driver 12 and shifts a gate start pulse. The gate output enable signal controls an output of the gate driver 12.

The data timing control signal DDC includes a source start pulse, a source sampling clock, a source output enable signal, etc. The source start pulse controls a data sampling start point of the data driver 13 and is transmitted to the data driver 13 at a start point of a scanning period. The source sampling clock controls a sampling operation of data within the data driver 13 based on a rising or falling edge. The source output enable signal controls an output of the data driver 13. In an embodiment, the source start pulse supplied to the data driver 13 is omitted, depending on a data transmission method.

The gate driver 12 sequentially generates scan signals Sn_1 to Sn_m in response to the gate timing control signal GDC received from the timing controller 14 using a turn-on voltage or a turn-off voltage received from the voltage generator 15. The gate driver 12 includes a plurality of transistors that are formed together with the pixels PX through a thin-film process. For example, the gate driver 12 may be mounted in the form of an amorphous silicon TFT gate driver circuit (ASG) or an oxide semiconductor TFT gate driver circuit (OSG) in the non-display area NDA.

The data driver 13 samples and latches image data DATA received from the timing controller 14 in response to the data timing control signal DDC received from the timing controller 14, and converts the same into data in a parallel data system. When converting image data DATA into data in a parallel data system, the data driver 13 converts the image data DATA into a gamma reference voltage, and converts the image data DATA into an analog data signal. The data driver 13 transmits data signals Dm_1 to Dm_n to the pixels PX through the data lines DL_1 to DL_n respectively. The pixels PX receive data signals Dm_1 to Dm_n in response to scan signals Sn_1 to Sn_m respectively.

Figure 6:
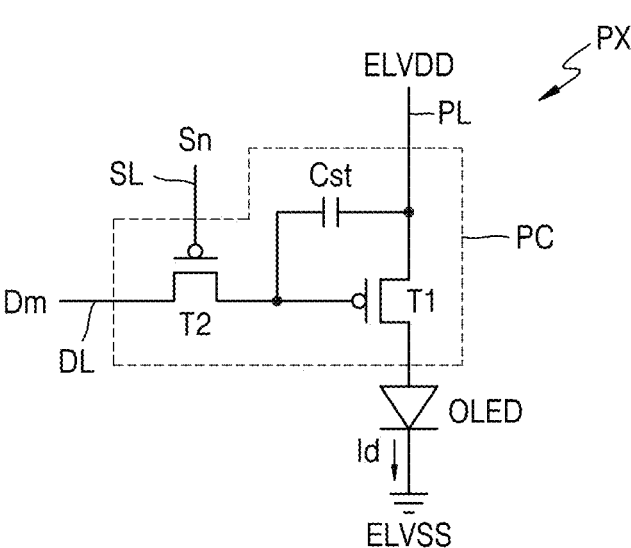
FIG. 6 is an equivalent circuit diagram of a pixel in a display apparatus according to an embodiment.

FIG. 6 is an equivalent circuit diagram of a pixel PX in a display apparatus according to an embodiment.

Referring to FIG. 6, in an embodiment, a pixel PX includes a pixel circuit PC and the display element connected to the pixel circuit PC, where the pixel circuit PC is connected to the scan line SL and the data line DL. The display element is an organic light-emitting diode OLED that includes a pixel electrode (an anode) and an opposite electrode (a cathode). The opposite electrode of the organic light-emitting diode OLED is a common electrode to which the second driving voltage ELVSS is applied.

The pixel circuit PC includes a first transistor T1, a second transistor T2, and a storage capacitor Cst.

The first transistor T1 is a driving transistor in which the magnitude of a drain current thereof is determined according to a gate-source voltage thereof, and the second transistor T2 is a switching transistor that is turned on/off according to a gate-source voltage. The first transistor T1 and the second transistor T2 may each be implemented as thin-film transistors.

The first transistor T1 may be denoted as a driving transistor, and the second transistor T2 may be denoted as a scan transistor.

The storage capacitor Cst is connected between the power line PL and a gate of the first transistor T1. The storage capacitor Cst includes a second electrode connected to the power line PL, and a first electrode connected to the gate of the first transistor T1. The storage capacitor Cst stores a voltage that corresponds to a difference between a voltage received from the second transistor T2 and the first driving voltage ELVDD supplied to the power line PL.

The first transistor T1 includes the gate connected to the first electrode of the storage capacitor Cst, a first terminal connected to the power line PL, and a second terminal connected to the organic light-emitting diode OLED. The first transistor T1 controls the magnitude of a driving current $I_d$ that flows to the organic light-emitting diode OLED from the power line PL according to a gate-source voltage. The organic light-emitting diode OLED emits light that has a brightness that corresponds to the driving current $I_d$.

The second transistor T2 includes a gate connected to the scan line SL, a drain connected to the data line DL, and a source connected to the gate of the first transistor T1. The second transistor T2 transmits a data signal Dm to the gate of the first transistor T1 in response to a scan signal Sn.

Although the pixel circuit PC is described with reference to FIG. 6 as including two transistors T1 and T2 and one storage capacitor Cst, embodiments are not necessarily limited thereto. For example, in some embodiments, the pixel circuit PC includes three or more transistors and/or two or more capacitors. In an embodiment, the pixel circuit PC includes three transistors and one capacitor. In an embodiment, the pixel circuit PC includes seven transistors and one capacitor.

Figure 7:
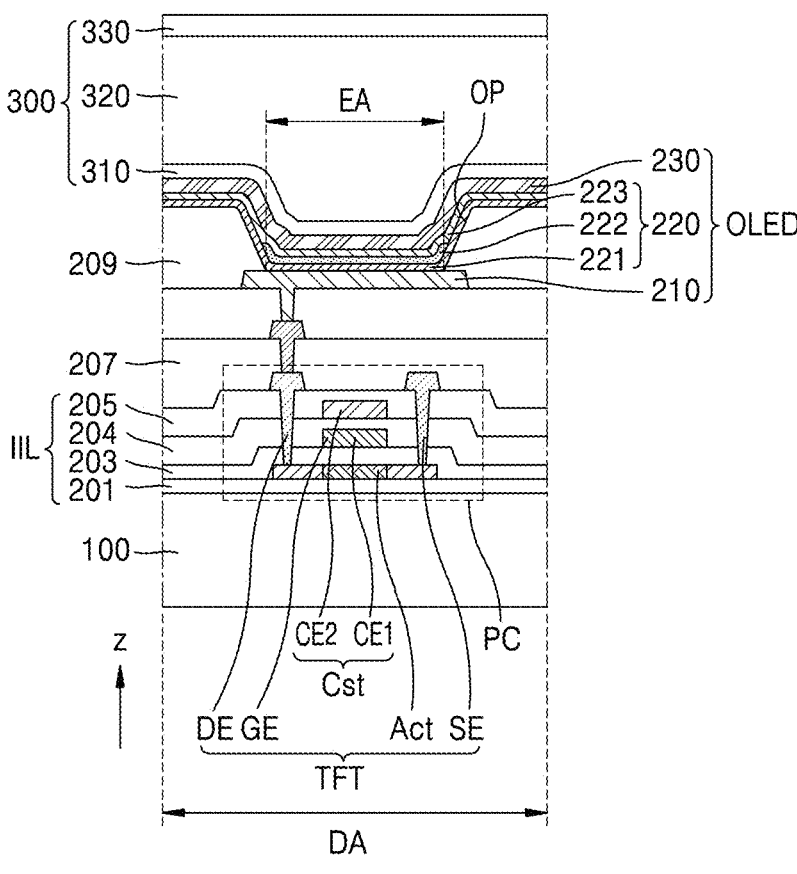
FIG. 7 is a cross-sectional view of a display apparatus according to an embodiment.

FIG. 7 is a cross-sectional view of a display apparatus according to an embodiment.

Referring to FIG. 7, in an embodiment, the display layer 200 (see FIG. 2) and the encapsulation layer 300 are sequentially stacked on the substrate 100 in the display area DA. The organic light-emitting diode OLED and the pixel circuit PC electrically connected to the organic light-emitting diode OLED are disposed in the display layer 200.

The substrate 100 includes an insulating material such as one or more of glass, quartz, or a polymer resin, etc. The substrate 100 may be a rigid substrate or a flexible substrate that is bendable, foldable, or rollable.

A buffer layer 201 is disposed on the substrate 100, and reduces or blocks penetration of foreign materials, moisture, or external air from below the substrate 100, and provides a flat surface for a semiconductor layer Act. The buffer layer 201 may include an inorganic material, an organic material, or an organic/inorganic composite material, and may include a single layer or multiple layers that include an inorganic material and an organic material, where the inorganic material includes an oxide or a nitride.

The pixel circuit PC is disposed over the buffer layer 201, and the pixel circuit PC includes a thin-film transistor TFT and the capacitor Cst. The thin-film transistor TFT corresponds to the first transistor T1 described with reference to FIG. 6.

The thin-film transistor TFT includes the semiconductor layer Act, a gate electrode GE, a drain electrode DE, and a source electrode SE.

The semiconductor layer Act is disposed on the buffer layer 201. In an embodiment, the semiconductor layer Act includes polycrystalline silicon. In an embodiment, the semiconductor layer Act includes amorphous silicon. In an embodiment, the semiconductor layer Act includes an oxide of at least one of indium (In), gallium (Ga), stannum (Sn), zirconium (Zr), vanadium (V), hafnium (Hf), cadmium (Cd), germanium (Ge), chromium (Cr), titanium (Ti), or zinc (Zn). The semiconductor layer Act includes a channel region, a source region, and a drain region, and the source region and the drain region are doped with impurities. The source region and the drain region are respectively disposed on two opposite sides of the channel region.

A first gate insulating layer 203 is disposed on the buffer layer 201 and covers the semiconductor layer Act. The first gate insulating layer 203 includes an inorganic insulating material such as at least one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The first gate insulating layer 203 may include a single layer or multiple layers that include the inorganic insulating materials.

The gate electrode GE is disposed on the first gate insulating layer 203 and overlaps the semiconductor layer Act. The gate electrode GE includes at least one of molybdenum (Mo), aluminum (Al), copper (Cu), or titanium (Ti), etc., and may include a single layer or multiple layers. For example, the gate electrode GE includes a single molybdenum layer.

A second gate insulating layer 204 is disposed on the first gate insulating layer 203 and covers the gate electrode GE. The second gate insulating layer 204 includes an inorganic insulating material such as at least one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The second gate insulating layer 204 may include a single layer or multiple layers that include the inorganic insulating materials.

A second electrode CE2 of the storage capacitor Cst is disposed on the second gate insulating layer 204. The second electrode CE2 overlaps the gate electrode GE. The gate electrode GE and the second electrode CE2 overlap each other with the second gate insulating layer 204 therebetween and form the storage capacitor Cst. For example, the gate electrode GE is a first electrode CE1 of the storage capacitor Cst.

The second electrode CE2 includes at least one of aluminum (Al), platinum (Pt), palladium (Pd), silver (Ag), magnesium (Mg), gold (Au), nickel (Ni), neodymium (Nd), iridium (Ir), chrome (Cr), calcium (Ca), molybdenum (Mo), titanium (Ti), tungsten (W), and/or copper (Cu), and may include a single layer or multiple layers that include the above materials.

An interlayer insulating layer 205 is disposed on the second gate insulating layer 204 and covers the second electrode CE2. The interlayer insulating layer 205 includes at least one of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The interlayer insulating layer 205 may include a single layer or multiple layers that include the inorganic insulating materials.

The buffer layer 201, the first gate insulating layer 203, the second gate insulating layer 204, and the interlayer insulating layer 205 may be referred to as inorganic insulating layers IIL.

The source electrode SE and the drain electrode DE are disposed on the interlayer insulating layer 205. The source electrode SE and the drain electrode DE each include a conductive material, such as at least one of molybdenum (Mo), aluminum (Al), copper (Cu), or titanium (Ti), and may include a single layer or multiple layers that include the above materials. For example, the source electrode SE and the drain electrode DE have a multi-layered structure of Ti/Al/Ti. In an embodiment, the source electrode SE or the drain electrode DE may be omitted. For example, an adjacent thin-film transistors TFT shares the source region or the drain region of the semiconductor layer Act. The source region or the drain region is the source electrode SE or the drain electrode DE.

A planarization insulating layer 207 is disposed on the interlayer insulating layer 205 and covers the source electrode SE and the drain electrode DE. The planarization insulating layer 207 provides a flat base surface for a pixel electrode 210 disposed thereon.

The planarization insulating layer 207 may include an organic material or an inorganic material, and may include a single-layered structure or a multi-layered structure. The organic material of the planarization insulating layer 207 includes a general-purpose polymer such as at least one of benzocyclobutene (BCB), polyimide, hexamethyldisiloxane (HMDSO), polymethylmethacrylate (PMMA) or polystyrene (PS), polymer derivatives that include a phenol-based group, an acryl-based polymer, an imide-based polymer, an aryl ether-based polymer, an amide-based polymer, a fluorine-based polymer, a p-xylene-based polymer, or a vinyl alcohol-based polymer. The inorganic insulating material of the planarization insulating layer 207 includes one or more of silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_x$). After the planarization insulating layer 207 is formed, chemical mechanical polishing is performed on the upper surface of the planarization insulating layer 207 to provide a flat upper surface.

The pixel electrode 210 is disposed on the planarization insulating layer 207. The planarization insulating layer 207 includes a via hole that exposes the source electrode SE or the drain electrode DE of the thin-film transistor TFT. The pixel electrode 210 is electrically connected to the thin-film transistor TFT by contacting the source electrode SE or the drain electrode DE through the via hole.

The pixel electrode 210 includes a conductive oxide such as at least one of indium tin oxide (ITO), indium zinc oxide (IZO), indium tin zinc oxide (ITZO), zinc oxide (ZnO), indium oxide ($In_2O_3$), indium gallium oxide (IGO), or aluminum zinc oxide (AZO). The pixel electrode 210 includes a reflective layer that includes at least one of silver (Ag), magnesium (Mg), aluminum (Al), platinum (Pt), palladium (Pd), gold (Au), nickel (Ni), neodymium (Nd), iridium (Ir), chrome (Cr), or a compound thereof. For example, the pixel electrode 210 has a structure that includes layers on/under the reflective layer, where the layers include at least one of ITO, IZO, ZnO, or $In_2O_3$. For example, the pixel electrode 210 has a stack structure of ITO/Ag/ITO.

A pixel-defining layer 209 covers edges of the pixel electrode 210 on the planarization insulating layer 207 and includes a pixel opening OP that exposes the central portion of the pixel electrode 210. An emission area EA of the organic light-emitting diode OLED, such as the size and shape of the pixel, is defined by the pixel opening OP.

The pixel-defining layer 209 prevents arcs, etc., from occurring at the edges of the pixel electrode 210 by increasing a distance between the edges of the pixel electrode 210 and an opposite electrode 230 over the pixel electrode 210. The pixel-defining layer 209 includes an organic insulating material such as at least one of polyamide, an acrylic resin, benzocyclobutene, or hexamethyldisiloxane (HMDSO), and can be formed by spin coating, etc.

The pixel-defining layer 209 is black. The pixel-defining layer 209 includes a black light-blocking material. The light-blocking material is at least one of carbon black, carbon nanotubes, a resin or paste that includes a black dye, metal particles, such as nickel (Ni), aluminum (Al), molybdenum (Mo), or an alloy thereof, metal oxide particles, such as chromium oxide, or metal nitride particles, such as chromium nitride. When the pixel-defining layer 209 includes a light-blocking material, outer reflection by a metal structure disposed below the pixel-defining layer 209 is reduced.

An intermediate layer 220 is disposed between the pixel electrode 210 and the opposite electrode 230. The intermediate layer 220 includes a first functional layer 221, an emission layer 222, and a second functional layer 223.

The emission layer 222 is disposed in the pixel opening OP of the pixel-defining layer 209, and corresponds to the pixel electrode 210. The emission layer 222 includes a polymer material or a low-molecular weight material and emits one of red, green, blue, or white light.

The first functional layer 221 and the second functional layer 223 are respectively arranged under and/or on the emission layer 222. In an embodiment, unlike the emission layer 222, which is patterned for each pixel, the first functional layer 221 and the second functional layer 223 are integrally provided over the entire display area DA.

The first functional layer 221 may include a single layer or multiple layers. For example, when the first functional layer 221 includes a polymer material, the first functional layer 221 includes a hole transport layer that has a single-layered structure, and includes at least one of polyethylene dioxythiophene (PEDOT: poly(3,4-ethylenedioxythiophene) or polyaniline (PANI: polyaniline). When the first functional layer 221 includes a low-molecular weight material, the first functional layer 221 includes a hole injection layer and a hole transport layer.

In an embodiment, the second functional layer 223 is omitted. For example, when the first functional layer 221 and the emission layer 222 include a polymer material, the second functional layer 223 is formed. The second functional layer 223 may include a single layer or multiple layers. The second functional layer 223 includes an electron transport layer and/or an electron injection layer. In an embodiment, at least one of a hole injection layer, a hole transport layer, an electron transport layer, and an electron injection layer is omitted.

The opposite electrode 230 includes a conductive material that has a relatively low work function. For example, the opposite electrode 230 includes a (semi) transparent layer that includes at least one of silver (Ag), magnesium (Mg), aluminum (Al), nickel (Ni), chromium (Cr), lithium (Li), calcium (Ca) or an alloy thereof. In an embodiment, the opposite electrode 230 further includes a layer that includes at least one of ITO, IZO, ZnO, or $In_2O_3$ disposed on the (semi) transparent layer. In an embodiment, the opposite electrode 230 includes silver (Ag) and magnesium (Mg).

A stack structure of the pixel electrode 210, the intermediate layer 220, and the opposite electrode 230 that are sequentially stacked forms the organic light-emitting diode OLED.

In an embodiment, a capping layer is disposed on the organic light-emitting diode OLED. The capping layer improves a light-emission efficiency of the organic light-emitting diode OLED based on a constructive interference principle. The capping layer may be an organic capping layer that includes an organic material, an inorganic capping layer that includes an inorganic material, or a composite capping layer that includes an organic material and an inorganic material.

The encapsulation layer 300 is disposed on the organic light-emitting diode OLED. In an embodiment, the encapsulation layer 300 includes at least one inorganic encapsulation layer and at least one organic encapsulation layer. For example, the encapsulation layer 300 includes a first inorganic encapsulation layer 310, a second inorganic encapsulation layer 330, and an organic encapsulation layer 320.

The first and second inorganic encapsulation layers 310 and 330 each include at least one inorganic insulating material. The inorganic insulating material is at least one of aluminum oxide ($Al_2O_3$), titanium oxide ($TiO_2$), tantalum oxide ($Ta_2O_5$), hafnium oxide ($HfO_2$), zinc oxide (ZnO), silicon oxide ($SiO_x$), silicon nitride ($SiN_x$), or/and silicon oxynitride (SiON). The first and second inorganic encapsulation layers 310 and 330 can each be formed by chemical vapor deposition.

The organic encapsulation layer 320 includes at least one of polyethylene terephthalate, polyethylene naphthalate, polycarbonate, polyimide, polyethylene sulfonate, polyoxymethylene, polyarylate, hexamethyldisiloxane (HMDSO), an acrylic resin, or a combination thereof.

The encapsulation layer 300 covers the entire display area DA, extends toward the non-display area NDA, and covers at least a portion of the non-display area NDA.

As described above, the encapsulation layer 300 includes the organic encapsulation layer 320 to provide a more planarized base surface. Accordingly, even when elements of the touch sensor layer 400 are formed by a continuous process, a defect rate is reduced.

Figure 8:
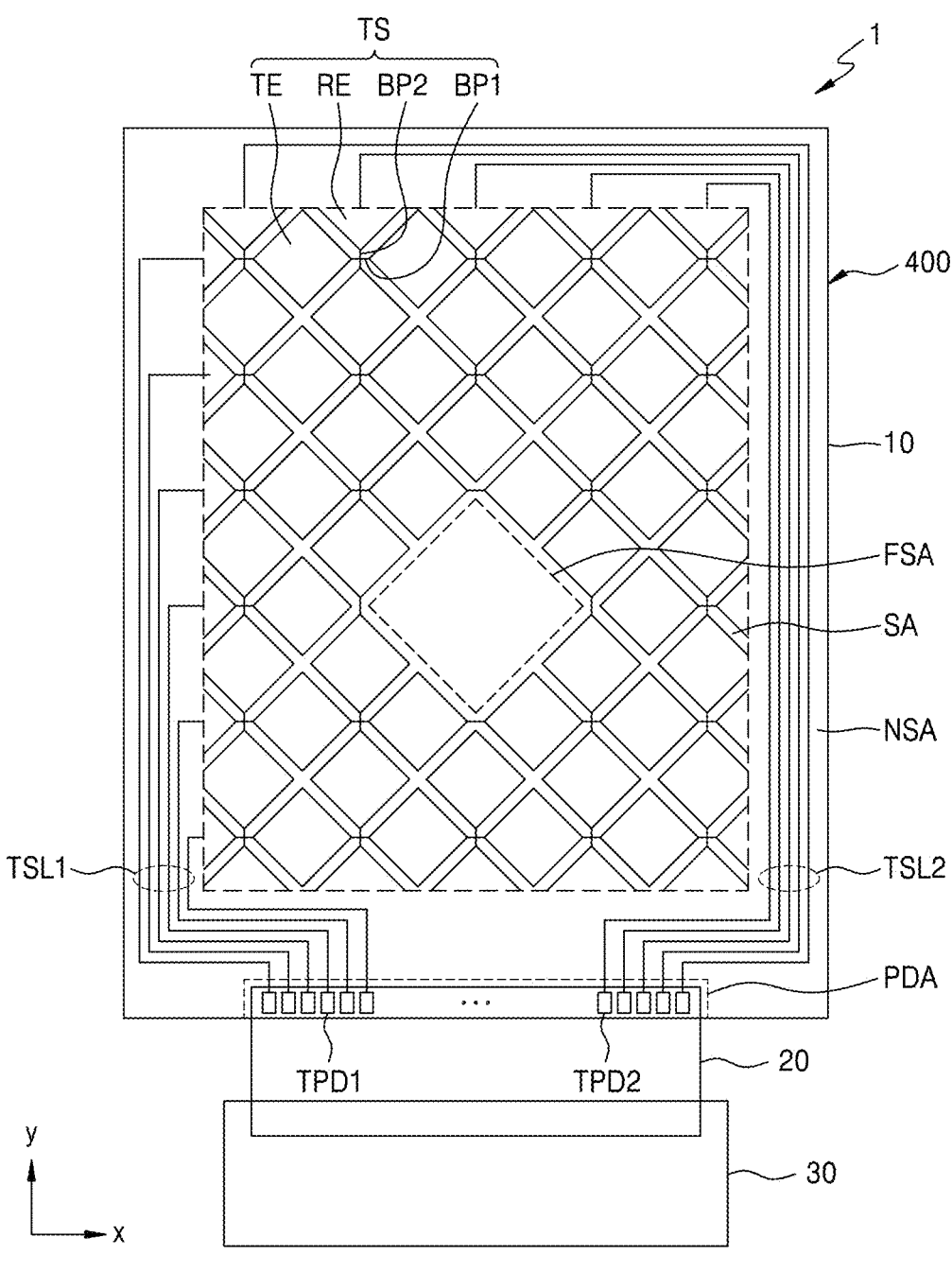
FIG. 8 is a schematic plan view of a display apparatus according to an embodiment.
Figure 9:
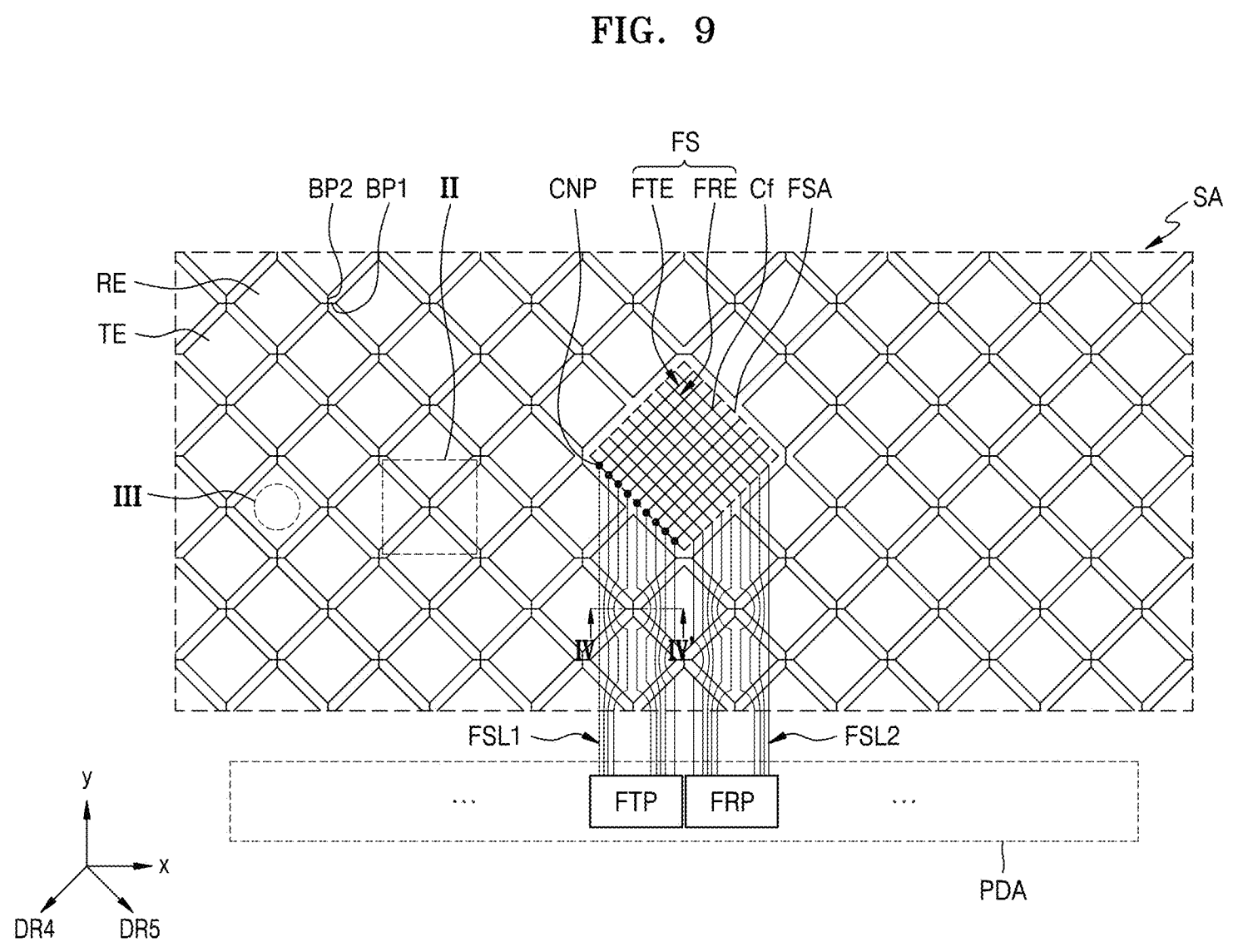

FIG. 8 is a schematic plan view of the display apparatus 1 according to an embodiment. FIG. 9 illustrates a portion of the display apparatus 1 shown in FIG. 8.

Referring to FIGS. 8 and 9, in an embodiment, the display apparatus 1 includes the display panel 10, the connection member 20, and the circuit board 30. FIG. 8 schematically shows the touch sensor layer 400 of the display panel 10. FIG. 9 schematically shows the touch sensing area SA around the fingerprint sensing area FSA, where the touch sensing area SA is adjacent to the fingerprint sensing area FSA.

The display panel 10 includes the fingerprint sensing area FSA in which the fingerprint sensor FS is arranged, the touch sensing area SA in which the sensing electrodes of the touch sensor TS are arranged, and the non-sensing area NSA. The fingerprint sensing area FSA is entirely surrounded by the touch sensing area SA. The non-sensing area NSA is arranged around the touch sensing area SA. The touch sensing area SA is entirely surrounded by the non-sensing area NSA. The pad area PDA is arranged on one side of the non-sensing area NSA.

In a plan view, the touch sensing area SA and the fingerprint sensing area FSA overlap the display area DA (see FIG. 3). In a plan view, the fingerprint sensing area FSA is arranged inside the display area DA. Accordingly, the pixels PX (see FIG. 3) are disposed below the touch sensor TS and the fingerprint sensor FS.

Touch pads TPD1 and TPD2 and fingerprint pads FTP and FRP are disposed in the pad area PDA, and the touch pads TPD1 and TPD2 are electrically connected to the touch sensor driver TDV (see FIG. 3) through the connection member 20, and the fingerprint pads FTP and FRP are electrically connected to the fingerprint sensor driver FDV (see FIG. 3) through the connection member 20. The fingerprint pads FTP and FRP include a fingerprint driving pad FTP connected to the first driving electrodes FTE of the fingerprint sensor FS, and fingerprint sensing pads FRP connected to the first sensing electrode FRE. The touch pads TPD1 and TPD2 include a touch driving pad TPD1 connected to the second driving electrodes TE of the touch sensor TS, and touch sensing pads TPD2 connected to the second sensing electrodes RE.

The connection member 20 connects the display panel 10 to the circuit board 30. In an embodiment, the connection member 20 is a chip-on-film, and an IC chip that forms at least a portion of the driving circuit portion DV (see FIG. 3) is mounted on the connection member 20.

The circuit board 30 is a flexible printed circuit board. The circuit board 30 is connected to one end of the connection member 20, and the connection member 20 is bent and disposed on the back side of the display panel 10.

The fingerprint sensor FS is arranged in the fingerprint sensing area FSA. The fingerprint sensor FS includes a plurality of sensing electrodes FTE and FRE. The fingerprint sensor FS includes the first driving electrodes FTE and the first sensing electrodes FRE. The first driving electrodes FTE extend in a fourth direction DR4 oblique to the first direction (the x direction) and the second direction (the y direction), and are spaced apart from each other in a fifth direction DR5 that crosses the fourth direction DR4. The first sensing electrodes FRE extend in the fifth direction DR5 and are spaced apart from each other in the fourth direction DR4. In a plan view, the first driving electrodes FTE and the first sensing electrodes FRE cross each other and form a mesh structure.

The first driving electrodes FTE and the first sensing electrodes FRE are disposed on different layers from each other. For example, the first driving electrodes FTE are disposed over the first sensing electrodes FRE, and at least one insulating layer is disposed between the first driving electrodes FTE and the first sensing electrodes FRE. The first driving electrode FTE and the first sensing electrode FRE overlap each other and form a capacitor Cf.

The fingerprint sensor FS is electrically connected to the fingerprint pads FTP and FRP through signal lines FSL1 and FSL2. For example, the first driving electrodes FTE are electrically connected to the fingerprint driving pads FTP through the first signal lines FSL1. The first sensing electrodes FRE are electrically connected to the fingerprint sensing pads FRP through the second signal line FSL2.

The first signal lines FSL1 and the second signal lines FSL2 are disposed on a different layer from the first driving electrodes FTE. For example, the first driving electrode FTE are disposed over the first signal line FSL1, and at least one insulating layer is disposed between the first driving electrode FTE and the first signal line FSL1. The first driving electrodes FTE are electrically connected to the first signal line FSL1 through a contact hole CNP that passes through the at least one insulating layer.

The first signal lines FSL1 and the second signal lines FSL2 are disposed on the same layer as the first sensing electrodes FRE. In an embodiment, the first sensing electrode FRE and the second signal line FSL2 are integrally provided. The first signal lines FSL1 and the second signal lines FSL2 cross a portion of the display area DA (see FIG.

3), and the pixels PX (see FIG. 3) are disposed below the first signal lines FSL1 and the second signal lines FSL2.

The touch sensor TS is arranged in the touch sensing area SA. The touch sensor TS includes the second driving electrodes TE, the second sensing electrodes RE, first bridge patterns BP1, and second bridge patterns BP2. Second driving electrodes TE that are adjacent to each other in the first direction (the x direction) are electrically connected to each other by the first bridge pattern BP1. Second sensing electrodes RE that are adjacent to each other in the second direction (the y direction) are electrically connected to each other by the second bridge pattern BP2.

In an embodiment, the second driving electrodes TE, the second sensing electrodes RE, and the second bridge patterns BP2 are disposed on the same layer. The first bridge patterns BP1 is disposed on a different layer from the second driving electrodes TE, the second sensing electrodes RE, and the second bridge patterns BP2. For example, the second driving electrodes TE are disposed over the first bridge patterns BP1, and at least one insulating layer is disposed between the second driving electrodes TE and the first bridge patterns BP1. The second driving electrodes TE are connected to the first bridge pattern BP1 through a contact hole that passes through the at least one insulating layer.

In an embodiment, the first signal lines FSL1 and the second signal lines FSL2 are disposed on the same layer as the first bridge patterns BP1. The first signal lines FSL1 and the second signal lines FSL2 are spaced apart from the first bridge patterns BP1. For example, at least some of the first signal lines FSL1 or the second signal lines FSL2 extend in the second direction (the y direction) and has a partially curved shape that detours around the first bridge patterns BP1.

The second driving electrodes TE are electrically connected to the touch driving pads TPD1 through the first touch signal lines TSL1. The second sensing electrodes RE are electrically connected to the touch sensing pads TPD2 through the second touch signal lines TSL2. The first touch signal lines TSL1 and the second touch signal lines TSL2 are arranged in the non-sensing area NSA.

Figure 10:
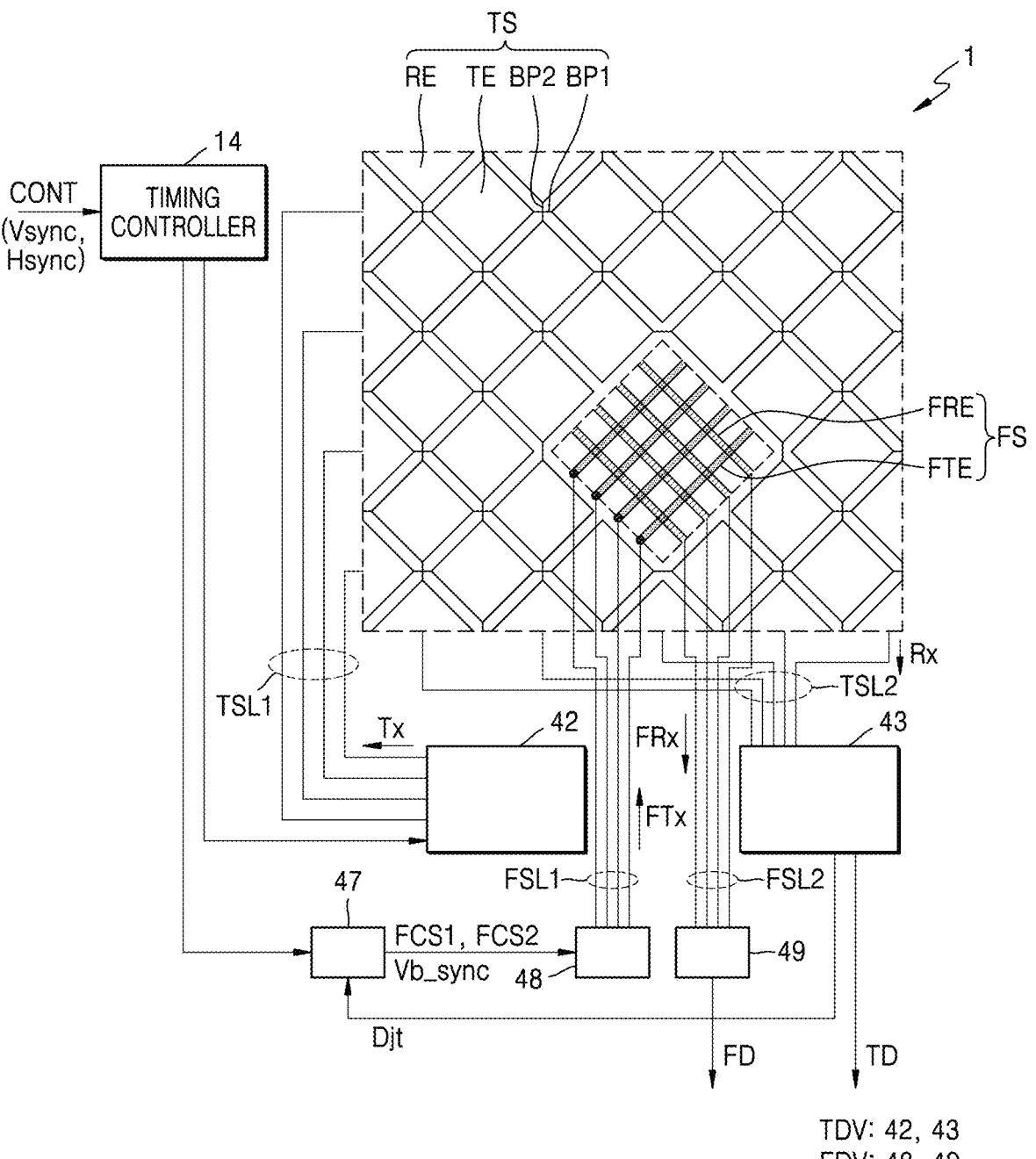
FIG. 10 is a schematic view of a display apparatus according to an embodiment.

FIG. 10 is a schematic view of the display apparatus 1 according to an embodiment.

Referring to FIG. 10, in an embodiment, the display apparatus 1 includes the timing controller 14, the touch sensor TS, the fingerprint sensor FS, the touch sensor driver TDV, the fingerprint sensor driver FDV, and a controller 47.

The fingerprint sensor driver FDV includes a fingerprint sensor driving signal portion 48 and a fingerprint sensor sensing portion 49. The fingerprint sensor driving signal portion 48 transmits a fingerprint driving signal FTx to the first driving electrodes FTE of the fingerprint sensor FS through the first signal lines FSL1. The fingerprint sensor sensing portion 49 receives a fingerprint sensing signal FRx that corresponds to a fingerprint driving signal FTx from the first sensing electrodes FRE of the fingerprint sensor FS through the second signal lines FSL2, and converts the fingerprint sensing signal FRx into a digital signal to obtain a user's fingerprint data FD.

The fingerprint sensor sensing portion 49 includes an analog front end that receives analog signals, and an analog-digital converter that converts the received analog signal into a digital signal.

The touch sensor driver TDV includes a touch driving signal portion 42 and a touch sensing portion 43. The touch driving signal portion 42 transmits a touch driving signal Tx to the second driving electrodes TE of the touch sensor TS through the first touch signal lines TSL1. The touch sensing portion 43 receives a touch sensing signal Rx that corresponds to a touch driving signal Tx from the second sensing electrodes RE of the touch sensor TS through the second touch signal lines TSL2, and converts the touch sensing signal Rx into a digital signal to obtain touch data TD that includes whether a user has input a touch and touch location information.

The touch sensing portion 43 includes an analog front end that receives analog signals, and an analog-digital converter that converts the received analog signal into a digital signal.

Because the touch sensing area SA (see FIG. 3) overlaps the display area DA (see FIG. 3), a parasitic capacitance can occur between the touch sensor TS and the pixel PX (see FIG. 3) below the touch sensor TS. Due to coupling of the parasitic capacitance, electrical signals, such as scan signals, data signals, etc., that drive the pixel PX can be transmitted to the touch sensor TS. Due to this display noise, a jitter phenomenon can occur in the touch data TD. The touch sensing portion 43 generates jitter data Djt based on a touch sensing signal Rx and corrects the touch data TD based on the jitter data Djt.

The timing controller 14 receives a control signal CONT from an external source. The control signal CONT includes a vertical synchronization signal Vsync, a horizontal synchronization signal Hsync, a data enable signal, a clock signal, etc. The timing controller 14 controls operation timings of the touch sensor driver TDV and the fingerprint sensor driver FDV using a control signal CONT.

The controller 47 is one of an application processor or an integrated circuit, etc., that is disposed separately from the fingerprint sensor driver FDV. The controller 47 generates a vertical blank signal Vb_sync and transmits the same to the fingerprint sensor driver FDV based on a vertical synchronization signal Vsync received from the timing controller 14. The vertical blank signal Vb_sync is supplied as an on-voltage during a vertical blank period and as an off-voltage during a period other than the vertical blank period. The fingerprint sensor driver FDV divides one frame into four sections based on the vertical blank signal Vb_sync.

In an embodiment, the controller 47 receives jitter data Djt from the touch sensor driver TDV. The controller 47 determines from the jitter data Djt whether noise is within a reference range, and determines a driving mode of the fingerprint sensor driver FDV.

For example, when noise is within the reference range, a first control signal FCS1 is transmitted to the fingerprint sensor driver FDV. When noise deviates from the reference range, the controller 47 transmits a second control signal FCS2 to the fingerprint sensor driver FDV.

When receiving a first control signal FCS1 from the controller 47, the fingerprint sensor driver FDV drives the fingerprint sensor FS once during an on-voltage period of a vertical blank signal Vb_sync, and drives the fingerprint sensor FS at least once during an off-voltage period of a vertical blank signal Vb_sync, thereby driving the fingerprint sensor FS at least twice during one frame. The fingerprint sensor driver FDV driving the fingerprint sensor FS once means that the fingerprint sensor driver FDV generates fingerprint data FD by sequentially transmitting fingerprint driving signals FTx to the first driving electrodes FTE and receiving fingerprint sensing signals FRx from the first sensing electrodes FRE.

When receiving a second control signal FCS2 from the controller 47, the fingerprint sensor driver FDV maintains an idle state without driving the fingerprint sensor FS during an off-voltage period of a vertical blank signal Vb_sync. For example, when receiving a second control signal FCS2, the fingerprint sensor driver FDV drives the fingerprint sensor FS once during an on-voltage period of a vertical blank signal Vb_sync, and maintains the fingerprint sensor FS in an idle state during an off-voltage period of a vertical blank signal Vb_sync, thereby driving the fingerprint sensor FS once during one frame.

Because the fingerprint sensing area FSA (see FIG. 3) overlaps the display area DA (see FIG. 3), a parasitic capacitance can occur between the fingerprint sensor FS and the pixel PX (see FIG. 3) below the fingerprint sensor FS. Due to coupling of the parasitic capacitance, electrical signals that driving the pixel PX can be transmitted to the fingerprint sensor FS. In the display apparatus 1 according to an embodiment, because the fingerprint sensor driver FDV drives the fingerprint sensor FS during a vertical blank period, an influence of display noise can be reduced.

The display apparatus 1 according to an embodiment can prevent or reduce distortion of fingerprint data FD due to a noise and can increase a fingerprint sensing performance by changing a driving mode of the fingerprint sensor driver FDV based on jitter data Djt.

Figure 11:
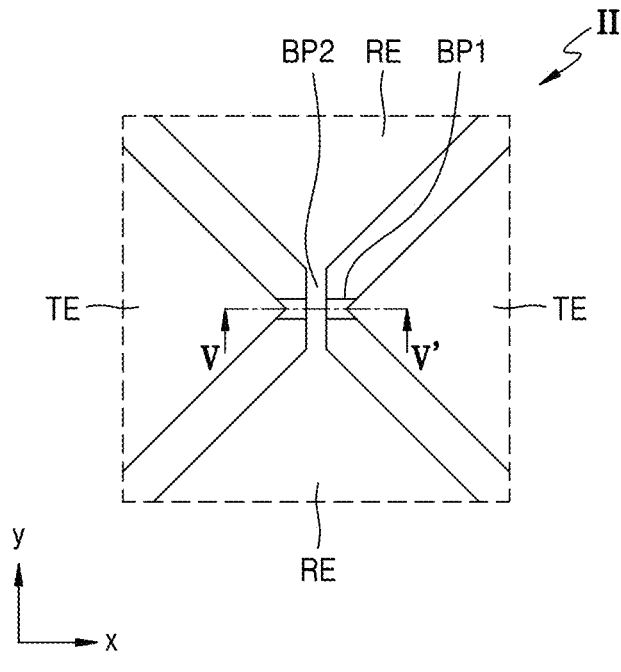
FIG. 11 is a plan view of a region II of the display apparatus shown in FIG. 9.
Figure 12:
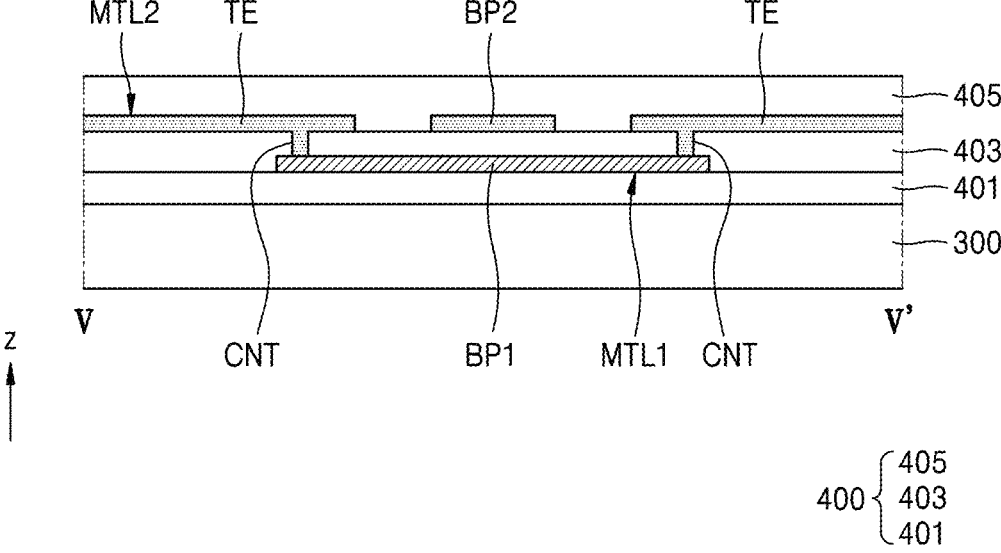
FIG. 12 is a cross-sectional view of the display apparatus of FIG. 11, taken along line V-V' of FIG. 11.
Figure 13:
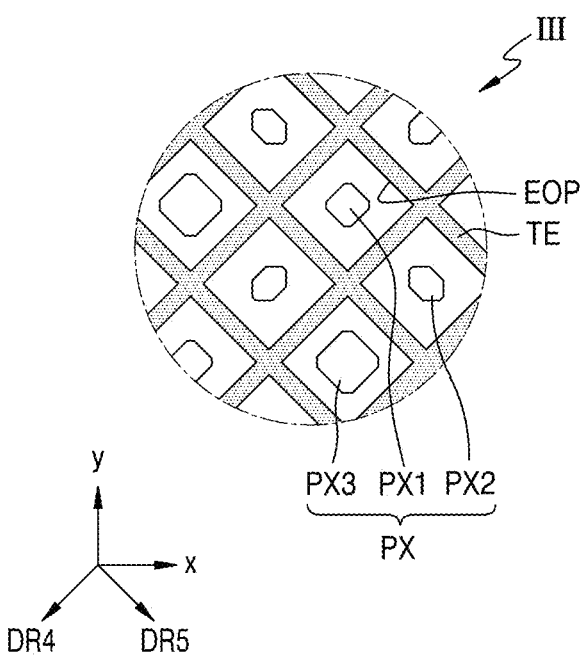
FIG. 13 is a schematic plan view a region III of the display apparatus shown in FIG. 9.

FIG. 11 is a plan view of a region II of the display apparatus shown in FIG. 9, FIG. 12 is a cross-sectional view of the display apparatus of FIG. 11, taken along line V-V' of FIG. 11, and FIG. 13 is a schematic plan view of a region III of the display apparatus shown in FIG. 9.

Referring to FIG. 11, in an embodiment, the touch sensor TS (see FIG. 3) includes the second driving electrodes TE, the second sensing electrodes RE, the first bridge pattern BP1, and the second bridge pattern BP2. The first bridge pattern BP1 electrically connects the second driving electrodes TE adjacent to each other in the first direction (the x direction). The second bridge pattern BP2 electrically connects the second sensing electrodes RE adjacent to each other in the second direction (the y direction).

In an embodiment, the second driving electrodes TE, the second sensing electrodes RE, and the second bridge patterns BP2 are disposed on the same layer, and the first bridge patterns BP1 are disposed on a different layer from the second driving electrodes TE, the second sensing electrodes RE, and the second bridge patterns BP2. The first bridge pattern BP1 is disposed below the second driving electrodes TE, the second sensing electrodes RE, and the second bridge patterns BP2. The second bridge pattern BP2 is integrally formed with the second sensing electrodes RE. The first bridge pattern BP1 extends in the first direction (the x direction), and the second bridge pattern BP2 extends in the second direction (the y direction) and overlaps the first bridge pattern BP1.

Referring to FIG. 12, in an embodiment, the touch sensor layer 400 (see FIG. 3) is disposed on the encapsulation layer 300. The touch sensor layer 400 includes a first conductive layer MTL1, a second conductive layer MTL2, and at least one insulating layer. In an embodiment, the touch sensor layer 400 includes a first insulating layer 401, a first conductive layer MTL1, a second insulating layer 403, a second conductive layer MTL2, and a third insulating layer 405.

The first insulating layer 401 is disposed on the encapsulation layer 300, and the first conductive layer MTL1 is disposed on the first insulating layer 401. The first insulating layer 401 prevents damage to the encapsulation layer 300 and reduces display noise that occurs when the display layer 200 (see FIG. 3) is driven. The first conductive layer MTL1 includes the first bridge patterns BP1.

The second insulating layer 403 is disposed on the first insulating layer 401 and the first conductive layer MTL1, and the second conductive layer MTL2 is disposed on the second insulating layer 403. The second conductive layer MTL2 includes the second driving electrodes TE, the second sensing electrodes RE (see FIG. 11), and the second bridge patterns BP2.

The first conductive layer MTL1 and the second conductive layer MTL2 may each have a single-layered structure or a stacked multi-layered structure. A single-layered conductive layer includes a metal layer or a transparent conductive layer. The metal layer includes at least one of molybdenum (Mo), silver (Ag), titanium (Ti), copper (Cu), aluminum (Al), or an alloy thereof. The transparent conductive layer includes a transparent conductive oxide such as one of ITO, IZO, ZnO, or ITZO. In addition, the transparent conductive layer includes a conductive polymer such poly(3,4-ethylenedioxythiophene) (PEDOT), metal nanowires, graphene, etc.

In an embodiment, a multi-layered conductive layer includes multiple metal layers. The multiple metal layers have, for example, a three-layered structure. The multi-layered conductive layer includes at least one transparent conductive layer.

The third insulating layer 405 is disposed on the second insulating layer 403 and the second conductive layer MTL2. The first insulating layer 401, the second insulating layer 403, and the third insulating layer 405 may each include an inorganic insulating material or an organic insulating material and have a single-layered structure or a multi-layered structure.

The first bridge pattern BP1 is electrically connected to the second driving electrodes TE through a contact hole CNT that passes through the second insulating layer 403.

Referring to FIG. 13, in an embodiment, the second driving electrode TE has a mesh (or a grid or a lattice) structure. The mesh structure includes metal patterns that extend in a fourth direction DR4 that crosses the first direction (the x direction) and the second direction (the y direction) and intersect metal patterns that extend in a fifth direction DR5 that crosses the fourth direction DR4. Accordingly, the second driving electrodes TE may define a plurality of electrode openings EOP.

Each of the electrode openings EOP overlaps one pixel PX. For example, the pixels PX include a first pixel PX1 that emits light of a first color, a second pixel PX2 that emits light of a second color, and a third pixel PX3 that emits light of a third color. In a plan view, the first pixel PX1, the second pixel PX2, and the third pixel PX3 are each disposed inside an electrode opening EOP.

In an embodiment, each of the electrode openings EOP overlaps one unit pixel group. One unit pixel group may include a plurality of pixels PX. For example, one unit pixel group includes one first pixel PX1, two second pixels PX2, and one third pixel PX3. For example, one unit pixel group includes one first pixel PX1, one second pixel PX2, and one third pixel PX3.

The second sensing electrodes RE, the first bridge patterns BP1, and the second bridge patterns BP2 may have a mesh structure that is similar or identical to that of the second driving electrode TE shown in FIG. 13. For example, the second sensing electrodes RE, the first bridge patterns BP1, and the second bridge patterns BP2 define a plurality of electrode openings EOP. Due to the mesh structure, light emitted by the pixels PX located below the touch sensor TS (see FIG. 3) penetrates the touch sensor layer 400 (see FIG. 3) through the electrode openings EOP.

Figure 14:
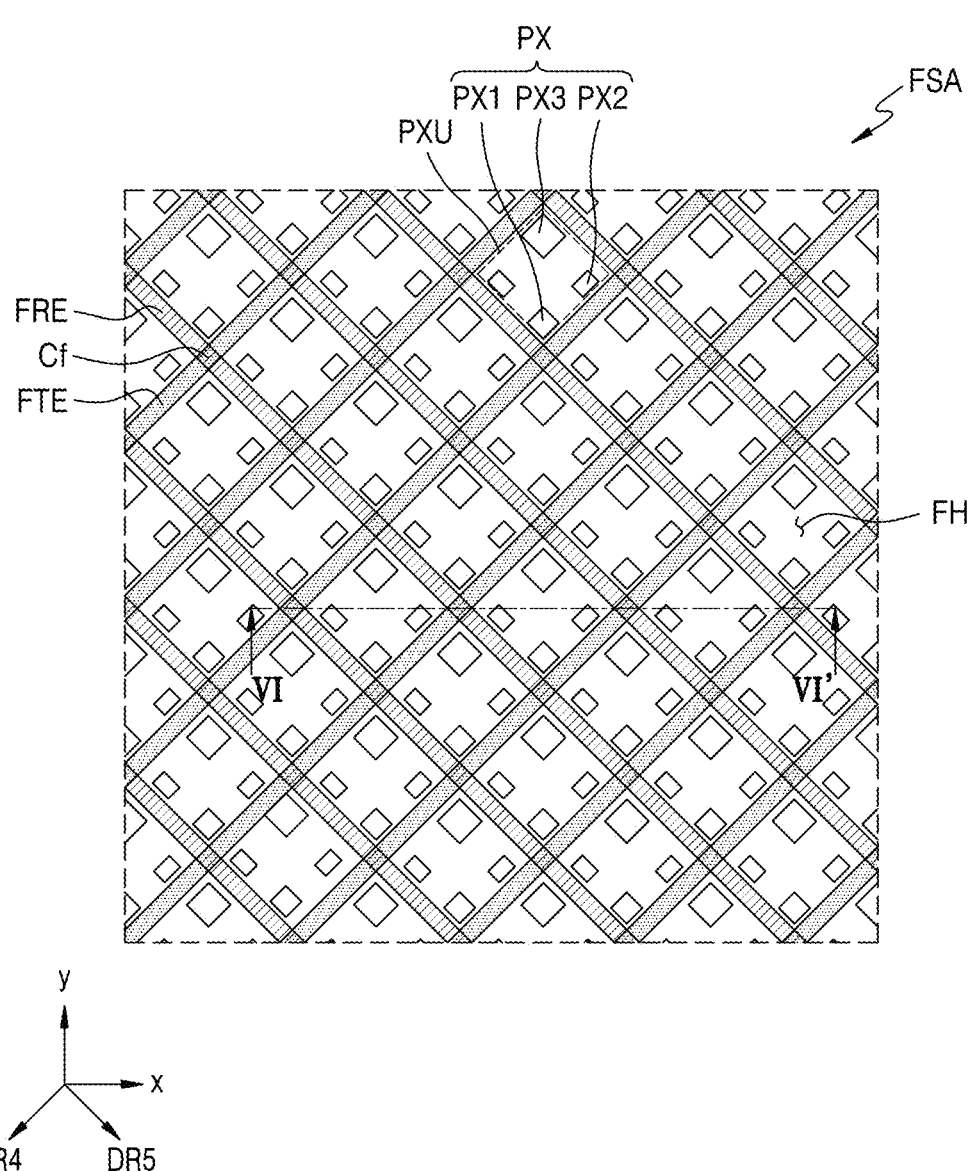
FIG. 14 is a schematic plan view of a display apparatus according to an embodiment.
Figure 15:
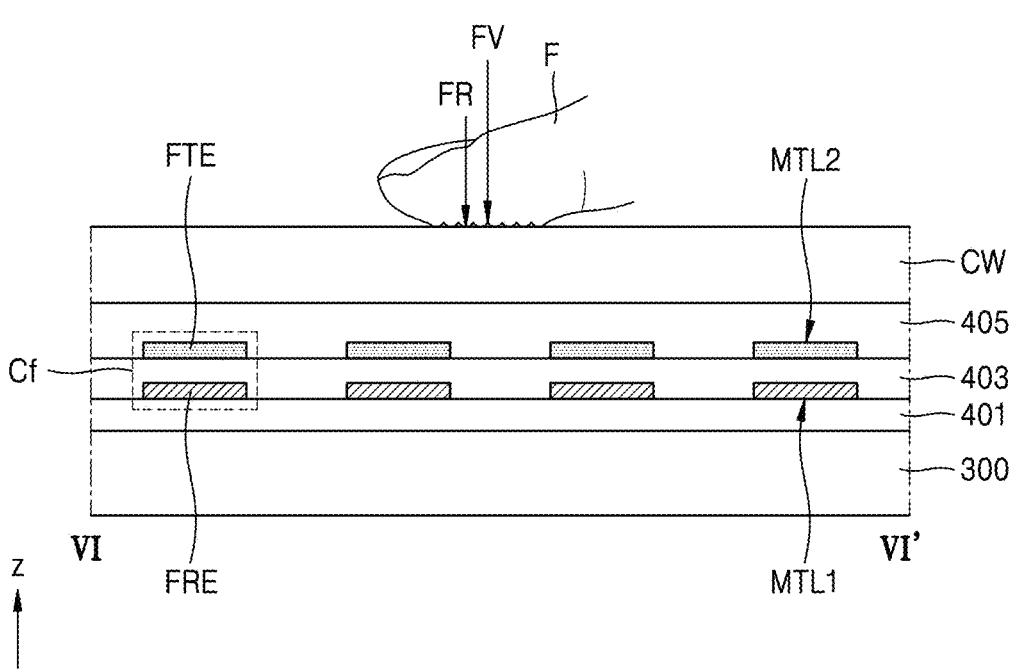
FIG. 15 is a cross-sectional view of the display apparatus of FIG. 14, taken along line VI-VI' of FIG. 14.

FIG. 14 is a schematic plan view of a display apparatus according to an embodiment, and FIG. 15 is a cross-sectional view of a display apparatus of FIG. 14, taken along line VI-VI' of FIG. 14.

Referring to FIG. 14, in an embodiment, the fingerprint sensor FS (see FIG. 3) is arranged in the fingerprint sensing area FSA. The fingerprint sensor FS includes the first driving electrodes FTE that extend in the fourth direction DR4 and the first sensing electrodes FRE that extend in the fifth direction DR5.

In an embodiment, the first driving electrodes FTE and the first sensing electrodes FRE are disposed on different layers from each other. For example, the first driving electrodes FTE are disposed on the first sensing electrodes FRE. In a plan view, the first driving electrodes FTE and the first sensing electrodes FRE cross each other and form a mesh structure. Accordingly, in a plan view, the first driving electrodes FTE and the first sensing electrodes FRE define a plurality of holes FH. At an intersection point of the mesh structure, the first driving electrodes FTE and the first sensing electrodes FRE overlap each other and form a capacitor Cf.

Each of the plurality of holes FH overlaps one unit pixel group PXU. For example, a unit pixel group PXU includes one first pixel PX1, two second pixels PX2, and one third pixel PX3. However, embodiments are not necessarily limited thereto. In some embodiments, the pixels PX are arranged in various other configurations to display images, such as a stripe configuration, a pentile configuration (PENTILE™), or a mosaic configuration, and the unit pixel group PXU varies according to the configuration of the pixels PX.

In an embodiment, each of the holes FH overlaps one pixel PX. For example, in a plan view, the first pixel PX1, the second pixel PX2, or the third pixel PX3 are disposed inside each hole FH.

Because the first driving electrodes FTE and the first sensing electrodes FRE have a mesh structure, light emitted by the pixels PX located below the fingerprint sensor FS (see FIG. 3) penetrates the touch sensor layer 400 (see FIG. 3) through the holes FH.

Referring to FIG. 15, in an embodiment, the touch sensor layer 400 (see FIG. 3) is disposed on the encapsulation layer 300. The touch sensor layer 400 includes the first conductive layer MTL1, the second conductive layer MTL2, and at least one insulating layer. In an embodiment, the touch sensor layer 400 includes the first insulating layer 401, the first conductive layer MTL1, the second insulating layer 403, the second conductive layer MTL2, and the third insulating layer 405.

The first insulating layer 401 is disposed on the encapsulation layer 300, and the first conductive layer MTL1 is disposed on the first insulating layer 401. The first conductive layer MTL1 includes the first sensing electrodes FRE. As shown in FIG. 12, the first conductive layer MTL1 includes the first bridge patterns BP1 of the touch sensor TS (see FIG. 3). For example, the first sensing electrode FRE and the first bridge patterns BP1 are disposed on the same layer.

The second insulating layer 403 is disposed on the first insulating layer 401 and the first conductive layer MTL1, and the second conductive layer MTL2 is disposed on the second insulating layer 403. The second conductive layer MTL2 includes the first driving electrodes FTE. As shown in FIG. 12, the second conductive layer MTL2 includes the second driving electrodes TE, the second sensing electrodes RE, and the second bridge patterns BP2 of the touch sensor TS (see FIG. 3). For example, the first driving electrodes FTE, the second driving electrodes TE, the second sensing electrodes RE, and the second bridge patterns BP2 are disposed on the same layer.

The third insulating layer 405 is disposed on the second insulating layer 403 and the second conductive layer MTL2. The cover window CW is disposed on the third insulating layer 405.

The first driving electrodes FTE and the first sensing electrodes FRE overlap each other to form the capacitors Cf. When a user's finger F is adjacent to the cover window CW, a capacitance of each capacitor Cf changes due to the shape of the ridges FR and valleys FV of the finger F. The fingerprint sensor driver FDV (see FIG. 3) obtains fingerprint data of a user's finger F based on each capacitance change amount.

Figure 16:
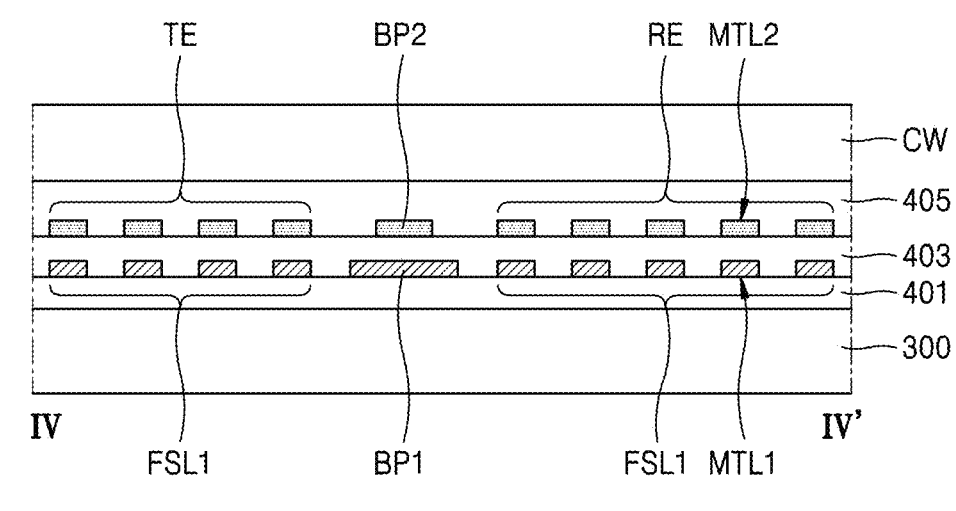
FIG. 16 is a cross-sectional view of the display apparatus of FIG. 9, taken along line IV-IV' of FIG. 9.

FIG. 16 is a cross-sectional view of a display apparatus of FIG. 9, taken along line IV-IV' of FIG. 9.

Referring to FIGS. 9 and 16, in an embodiment, the first driving electrodes FTE of the fingerprint sensor FS are electrically connected to the fingerprint driving pads FTP through the first signal lines FSL1, and the first sensing electrodes FRE are electrically connected to the fingerprint sensing pads FRP through the second signal lines FSL2.

In an embodiment, the signal lines FSL1 and FSL2 are disposed on the same layer as the first sensing electrode FRE. The signal lines FSL1 and FSL2 are disposed on a different layer from the first driving electrode FTE. For example, the first signal lines FSL1 and the second signal lines FSL2 are included in the first conductive layer MTL1.

The signal lines FSL1 and FSL2 cross a portion of the touch sensing area SA. The second driving electrode TE, the second sensing electrode RE, and the second bridge pattern BP2 are included in the second conductive layer MTL2 and are spaced apart in a third direction DR3 (a z direction) from the first signal lines FSL1 and the second signal lines FSL2 with at least one insulating layer, such as the second insulating layer 403, therebetween. In a plan view, the first signal lines FSL1 and the second signal lines FSL2 overlap the second driving electrodes TE and the second sensing electrodes RE.

The first signal lines FSL1 and the second signal lines FSL2 are spaced apart from the first bridge patterns BP1 disposed on the same layer. The first signal lines FSL1 and the second signal lines FSL2 detour around a region in which the first bridge patterns BP1 are arranged so as not to overlap the first bridge patterns BP1. At least a portion of the first signal lines FSL1 and the second signal lines FSL2 have a curved shape to detour around the first bridge pattern BP1.

The first signal lines FSL1 and the second signal lines FSL2 are disposed below the second driving electrodes TE and the second sensing electrodes RE and can obtain a user's fingerprint data in the fingerprint sensing area FSA located inside the touch sensing area SA without affecting the touch sensitivity of the touch sensor TS (see FIG. 3). In addition, because the shapes of the sensing electrodes of the touch sensor TS in a region in which the first signal lines FSL1 and the second signal lines FSL2 are located are the same as those of the sensing electrodes in the other regions, a deviation in the touch sensitivity is reduced.

Figure 17:
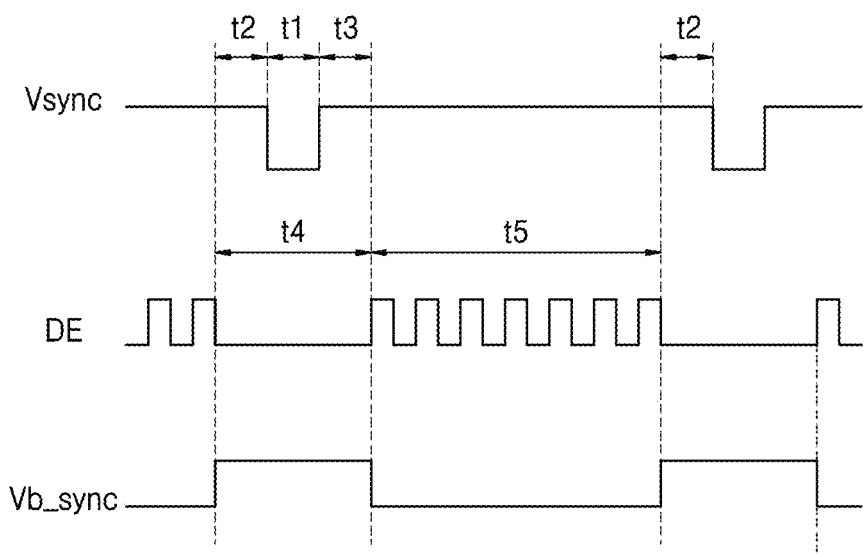
FIG. 17 illustrates driving signals of a display apparatus according to an embodiment.
Figure 18:
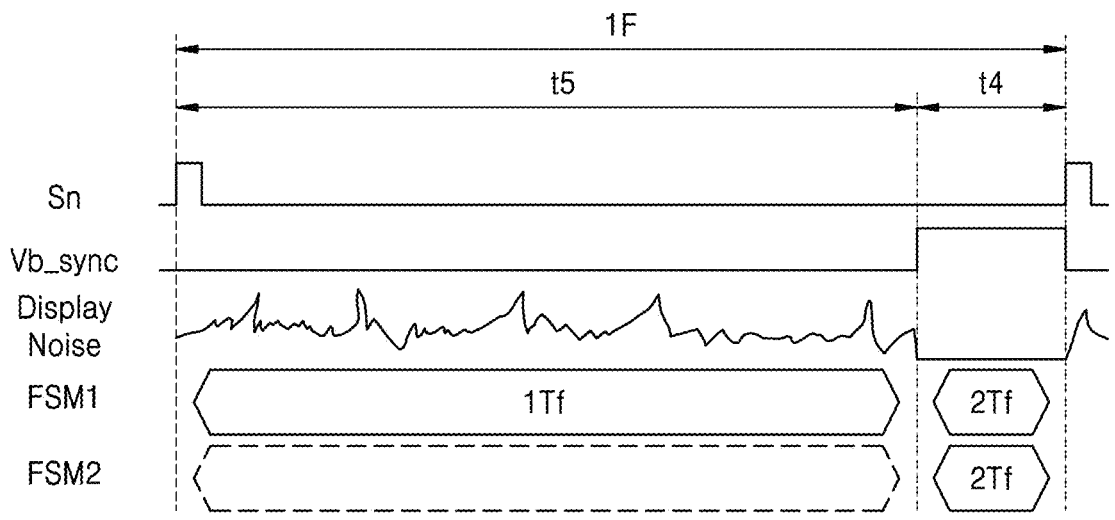
FIG. 18 illustrates driving of a fingerprint sensing apparatus according to an embodiment.

FIG. 17 illustrates driving signals of a display apparatus according to an embodiment, and FIG. 18 illustrates driving of a fingerprint sensing apparatus according to an embodiment.

Referring to FIG. 17, in an embodiment, a control signal CONT (see FIG. 10) received by the timing controller 14 (see FIG. 10) from an external source includes a vertical synchronization signal Vsync, a horizontal synchronization signal, a data enable signal DE, a clock signal, etc. The controller 47 (see FIG. 10) generates a vertical blank signal Vb_sync based on a vertical synchronization signal Vsync received from the timing controller 14 and transmits the same to the fingerprint sensor driver FDV (see FIG. 10).

A vertical synchronization signal Vsync is a reference signal that indicates a start or end of one frame. A data enable signal DE indicates a section of the frame in which valid image data is actually present within one line time. For example, one pulse period of a data enable signal DE is one horizontal period, and one horizontal period is a time required to write data in one pixel row, which are pixels connected to the same scan line.

A first period t1 represents an on-voltage period of a vertical synchronization signal Vsync. A second period t2 represents a period from after a last pulse of a data enable signal DE in a previous frame to before the first period t1, and a third period t3 represents a period from after the first period t1 to before a first pulse of a data enable signal DE in a relevant frame. The second period t2 is a vertical front porch, and the third period t3 is a vertical back porch.

A fourth period t4 is a period in which there is no on-voltage pulse of a data enable signal DE and may be denoted as a vertical blank period. The fourth period t4 includes the first period t1, the second period t2, and the third period t3.

A fifth period t5 is a period in which an on-voltage pulse of a data enable signal DE is output with a preset interval and may be denoted as a display active period.

A vertical blank signal Vb_sync is supplied as an on-voltage during the fourth period t4 and supplied as an off-voltage during the fifth period t5. For example, an on-voltage period of the vertical blank signal Vb_sync coincides with the vertical blank period.

Referring to FIG. 18, in an embodiment, one frame 1F includes the fourth period t4 and the fifth period t5. During the fifth period t5, scan signals Sn are transmitted to the pixels PX (see FIG. 3) through the scan line SL (see FIG. 3). Scan signals Sn and data signals transmitted to the pixels PX can act as display noise with respect to the fingerprint sensor FS (see FIG. 3). Because scan signals Sn and data signals are not transmitted during the fourth period t4, display noise can be prevented or reduced.

Referring to FIG. 10 together with FIG. 18, the controller 47 generates a vertical blank signal Vb_sync that is supplied as an on-voltage during the fourth period t4 and as an off-voltage during the fifth period t5, and transmits the vertical blank signal Vb_sync to the fingerprint sensor driver FDV. An on-voltage period of the vertical blank signal Vb_sync coincides with the fourth period t4, and an off-voltage period of the vertical blank signal Vb_sync coincides with the fifth period t5. The fingerprint sensor driver FDV time divides one frame 1F into a first fingerprint sensing period 1Tf and a second fingerprint sensing period 2Tf based on the vertical blank signal Vb_sync.

The touch sensing portion 43 of the touch sensor driver TDV generates jitter data Djt based on a touch sensing signal Rx and transmits the jitter data Djt to the controller 47. The jitter data Djt includes display noise information.

The controller 47 determines from the jitter data Djt whether noise is within a reference range and determines a driving mode of the fingerprint sensor driver FDV. When noise is within the reference range based on the jitter data Djt, the controller 47 transmits a first control signal FCS1 to the fingerprint sensor driver FDV, and when noise deviates from the reference range, the controller 47 transmits a second control signal FCS2 to the fingerprint sensor driver FDV. When receiving a first control signal FCS1, the fingerprint sensor driver FDV is driven in a first driving mode FSM1, and when receiving a second control signal FCS2, the fingerprint sensor driver FDV is driven in a second driving mode FSM2.

When driven in the first driving mode FSM1, the fingerprint sensor driver FDV drives the fingerprint sensor FS twice during one frame 1F. For example, the fifth period t5 includes the first fingerprint sensing period 1Tf, and the fourth period t4 includes the second fingerprint sensing period 2Tf. During the first fingerprint sensing period 1Tf, the fingerprint sensor driver FDV drives the fingerprint sensor FS once, and during the second fingerprint sensing period 2Tf, the fingerprint sensor driver FDV drives the fingerprint sensor FS once.

When driven in the second driving mode FSM2, the fingerprint sensor driver FDV drives the fingerprint sensor FS once during one frame 1F. For example, in the second driving mode FSM2, the fingerprint sensor driver FDV maintains the fingerprint sensor FS in an idle state during the first fingerprint sensing period 1Tf, and drives the fingerprint sensor FS once during the second fingerprint sensing period 2Tf in the fourth period t4.

When driven in the first driving mode FSM1, the fingerprint sensor driver FDV operates at a first report rate, and when driven in the second driving mode FSM2, the fingerprint sensor driver FDV operates at a second report rate. For example, the first report rate is greater than the second report rate. For example, the first report rate is twice the second report rate.

In an embodiment, when a frame rate of the display driver DDV (see FIG. 3) is about 120 Hz, the first report rate of the fingerprint sensor driver FDV is about 240 Hz, and the second report rate may be about 120 Hz.

Because, in the first driving mode FSM1 and the second driving mode FSM2, the fingerprint sensor driver FDV drives the fingerprint sensor FS once during the second fingerprint sensing period 2Tf, an influence of display noise on fingerprint data FD can be reduced. The fingerprint sensor driver FDV increases a report rate of the fingerprint sensor driver FDV by driving the fingerprint sensor FS one more time even during the fifth period t5, which is a display active period, in the first driving mode FSM1. In the second driving mode FSM2, the fingerprint sensor driver FDV reduces power consumption by reducing a driving time of the fingerprint sensor FS.

Figure 19:
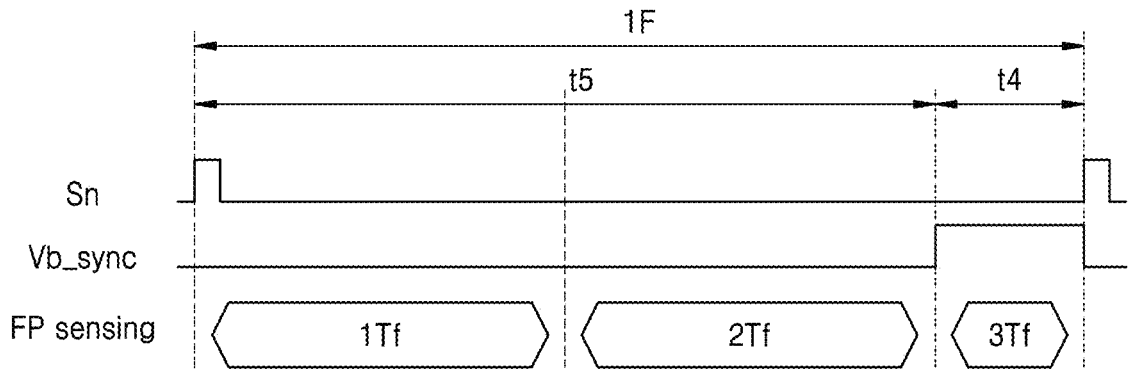
FIG. 19 illustrates driving of a fingerprint sensing apparatus according to an embodiment.

FIG. 19 illustrates driving of a fingerprint sensing apparatus according to an embodiment.

Referring to FIG. 19, in an embodiment, one frame 1F includes the fourth period t4 and the fifth period t5. During the fifth period t5, scan signals Sn are transmitted to the pixels PX (see FIG. 3) through the scan line SL (see FIG. 3). Scan signals Sn and data signals transmitted to the pixels PX can act as display noise with respect to the fingerprint sensor FS (see FIG. 3). Because scan signals Sn and data signals maintain an off-voltage during the fourth period t4, display noise can be prevented or reduced.

Referring to FIG. 10 together with FIG. 19, the controller 47 generates a vertical blank signal Vb_sync that is supplied as an on-voltage during the fourth period t4 and as an off-voltage during the fifth period t5, and transmits the vertical blank signal Vb_sync to the fingerprint sensor driver FDV.

The fingerprint sensor driver FDV time divides one frame 1F into a first fingerprint sensing period (a first fingerprint driving period) 1Tf, a second fingerprint sensing period (a second fingerprint driving period) 2Tf, and a third fingerprint sensing period (a third fingerprint driving period) 3Tf. For example, the fifth period t5 includes the first fingerprint sensing period 1Tf and the second fingerprint sensing period 2Tf, and the fourth period t4 includes the third fingerprint sensing period 3Tf. An off-voltage period of the vertical blank signal Vb sync equals the combined duration of the first fingerprint driving period 1Tf and the second fingerprint driving period 2Tf, an on-voltage period of the vertical blank signal Vb_sync coincides with the third fingerprint driving period 3Tf. The trigger signal for the second fingerprint driving period is not particularly restricted. Various signals of the display device can be used.

During each of the first fingerprint sensing period 1Tf, the second fingerprint sensing period 2Tf, and the third fingerprint sensing period 3Tf, the fingerprint sensor driver FDV drives the fingerprint sensor FS once. Accordingly, the fingerprint sensor driver FDV drives the fingerprint sensor FS three times during one frame 1F.

When a frame rate of the display driver DDV (see FIG. 3) has a first value, a report rate of the fingerprint sensor driver FDV has a second value that is three times the first value. In an embodiment, when a frame rate of the display driver DDV is about 120 Hz, a report rate of the fingerprint sensor driver FDV is about 360 Hz.

The fingerprint sensor driver FDV increases a report rate of the fingerprint sensor driver FDV without deteriorating display quality by driving the fingerprint sensor FS twice during the fifth period t5, which is a display active period, and driving the fingerprint sensor FS once during the fourth period t4.

Figure 20:
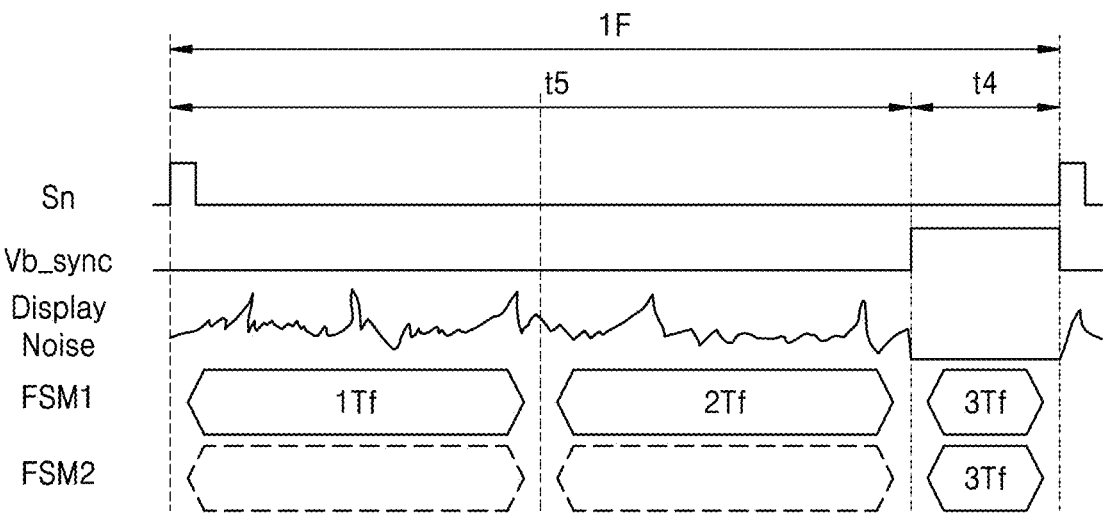
FIG. 20 illustrates driving of a fingerprint sensing apparatus according to an embodiment.

FIG. 20 illustrates driving of a fingerprint sensing apparatus according to an embodiment.

Referring to FIG. 20, in an embodiment, one frame 1F includes the fourth period t4 and the fifth period t5. During the fifth period t5, scan signals Sn are transmitted to the pixels PX (see FIG. 3) through the scan line SL (see FIG. 3). Scan signals Sn and data signals transmitted to the pixels PX can act as display noise with respect to the fingerprint sensor FS (see FIG. 3). Because scan signals Sn and data signals maintain an off-voltage during the fourth period t4, display noise can be prevented or reduced.

Referring to FIG. 10 together with FIG. 20, the controller 47 generates a vertical blank signal Vb_sync that is supplied as an on-voltage during the fourth period t4 and as an off-voltage during the fifth period t5, and transmits the vertical blank signal Vb_sync to the fingerprint sensor driver FDV. The fingerprint sensor driver FDV time divides one frame 1F into the first fingerprint sensing period 1Tf, the second fingerprint sensing period 2Tf, and the third fingerprint sensing period 3Tf. For example, the fifth period t5 includes the first fingerprint sensing period 1Tf and the second fingerprint sensing period 2Tf, and the fourth period t4 includes the third fingerprint sensing period 3Tf. An off-voltage period of the vertical blank signal Vb sync coincides with the first fingerprint driving period 1Tf and the second fingerprint driving period 2Tf, an on-voltage period of the vertical blank signal Vb_sync coincides with the third fingerprint driving period 3Tf.

The touch sensing portion 43 of the touch sensor driver TDV generates jitter data Djt based on a touch sensing signal Rx and transmits the jitter data Djt to the controller 47. The jitter data Djt includes display noise information.

The controller 47 determines from the jitter data Djt whether noise is within a reference range and determines a driving mode of the fingerprint sensor driver FDV. When noise is within the reference range based on the jitter data Djt, the controller 47 transmits a first control signal FCS1 to the fingerprint sensor driver FDV, and when noise deviates from the reference range, the controller 47 transmits a second control signal FCS2 to the fingerprint sensor driver FDV. When receiving a first control signal FCS1, the fingerprint sensor driver FDV is driven in a first driving mode FSM1, and when receiving a second control signal FCS2, the fingerprint sensor driver FDV is driven in a second driving mode FSM2.

When driven in the first driving mode FSM1, the fingerprint sensor driver FDV drives the fingerprint sensor FS three times during one frame 1F. For example, during each of the first fingerprint sensing period 1Tf, the second fingerprint sensing period 2Tf, and the third fingerprint sensing period 3Tf, the fingerprint sensor driver FDV drives the fingerprint sensor FS once.

When driven in the second driving mode FSM2, the fingerprint sensor driver FDV drives the fingerprint sensor FS once during one frame 1F. For example, in the second driving mode FSM2, the fingerprint sensor driver FDV maintains the fingerprint sensor FS in an idle state during the first fingerprint sensing period 1Tf and the second fingerprint sensing period 2Tf, and drives the fingerprint sensor FS once during the third fingerprint sensing period 3Tf in the fourth period t4.

When driven in the first driving mode FSM1, the fingerprint sensor driver FDV operates at a first report rate, and when driven in the second driving mode FSM2, the fingerprint sensor driver FDV operates at a second report rate. For example, the first report rate is greater than the second report rate. For example, the first report rate is three times the second report rate.

In an embodiment, when a frame rate of the display driver DDV (see FIG. 3) is about 120 Hz, the first report rate of the fingerprint sensor driver FDV is about 360 Hz, and the second report rate is about 120 Hz.

Because, in the first driving mode FSM1 and the second driving mode FSM2, the fingerprint sensor driver FDV drives the fingerprint sensor FS once during the third fingerprint sensing period 3Tf, an influence of display noise on fingerprint data FD can be reduced. The fingerprint sensor driver FDV increases a report rate of the fingerprint sensor driver FDV by driving the fingerprint sensor FS twice more even during the fifth period t5, which is a display active period, in the first driving mode FSM1. In the second driving mode FSM2, the fingerprint sensor driver FDV reduces power consumption by reducing a driving time of the fingerprint sensor FS.

According to an embodiment that has an above configuration, a display apparatus that includes a fingerprint sensing apparatus with increased fingerprint sensing performance can be implemented. However, the scope of embodiments of the disclosure is not limited by this effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus, comprising:
a fingerprint sensor disposed in a first area and that includes a plurality of first sensing electrodes and a plurality of second sensing electrodes;
a touch sensor disposed in a second area that surrounds the first area, wherein the touch sensor includes a plurality of third sensing electrodes and a plurality of fourth sensing electrodes;
a fingerprint sensor driver that transmits a first driving signal to the fingerprint sensor and receives a first sensing signal from the fingerprint sensor;
a touch sensor driver that transmits a second driving signal to the touch sensor and receives a second sensing signal from the touch sensor; and
a controller that generates a vertical blank signal that has an on-voltage during a vertical blank period and transmits the vertical blank signal to the fingerprint sensor driver,
wherein, during an on-voltage period of the vertical blank signal, the fingerprint sensor driver drives the fingerprint sensor once.

2. The display apparatus of claim 1, further comprising:
a plurality of signal lines that connect the fingerprint sensor to the fingerprint sensor driver,
wherein the plurality of first sensing electrodes, the plurality of third sensing electrodes, and the plurality of fourth sensing electrodes are disposed on a different layer from the plurality of signal lines.

3. The display apparatus of claim 2, wherein third sensing electrodes of the plurality of third sensing electrodes that are adjacent to each other in a first direction are connected to each other by a bridge pattern, wherein the bridge pattern is disposed on a same layer as the plurality of signal lines and the plurality of signal lines detour around the bridge pattern.

4. The display apparatus of claim 2, wherein the plurality of signal lines overlap the plurality of third sensing electrodes and the plurality of fourth sensing electrodes.

5. The display apparatus of claim 2, further comprising a plurality of pixels disposed below the fingerprint sensor and the touch sensor, wherein the plurality of signal lines overlap the plurality of pixels.

6. The display apparatus of claim 1, wherein
the touch sensor driver further generates jitter data in response to the second sensing signal and transmits the jitter data to the controller, and
the controller further determines whether noise in the jitter data is within a reference range, transmits a first control signal to the fingerprint sensor driver in response to the noise being within the reference range, and transmits a second control signal to the fingerprint sensor driver in response to the noise deviating from the reference range.

7. The display apparatus of claim 6, wherein,
in response to receiving the first control signal, the fingerprint sensor driver drives the fingerprint sensor at least once during an off-voltage period of the vertical blank signal, and
in response to receiving the second control signal, the fingerprint sensor driver maintains the fingerprint sensor in an idle state during the off-voltage period of the vertical blank signal.

8. The display apparatus of claim 7, wherein,
in response to receiving the first control signal, the fingerprint sensor driver operates at a first report rate, and in response to receiving the second control signal, the fingerprint sensor driver operates at a second report rate, and
the first report rate is greater than the second report rate.

9. The display apparatus of claim 8, wherein the first report rate is twice the second report rate.

10. The display apparatus of claim 8, wherein the first report rate is three times the second report rate.

11. The display apparatus of claim 1, wherein the plurality of first sensing electrodes and the plurality of second sensing electrodes are disposed on different layers from each other.

12. The display apparatus of claim 11, wherein each of the plurality of first sensing electrodes extends in a first direction, and each of the plurality of second sensing electrodes extends in a second direction that crosses the first direction.

13. The display apparatus of claim 11, further comprising:
a plurality of first signal lines that connect the plurality of first sensing electrodes to the fingerprint sensor driver; and
a plurality of second signal lines that connect the plurality of second sensing electrodes to the fingerprint sensor driver,
wherein the plurality of first signal lines and the plurality of second signal lines are disposed on a same layer as the plurality of second sensing electrodes.

14. The display apparatus of claim 13, wherein each of the plurality of second signal lines is integrally formed with a corresponding one of the plurality of second sensing electrodes.

15. A display apparatus, comprising:
a fingerprint sensor disposed in a first area and that includes a plurality of first sensing electrodes and a plurality of second sensing electrodes;
a touch sensor disposed in a second area that surrounds the first area, wherein the touch sensor includes a plurality of third sensing electrodes and a plurality of fourth sensing electrodes;
a fingerprint sensor driver that transmits a first driving signal to the fingerprint sensor and receives a first sensing signal from the fingerprint sensor to generate fingerprint data;
a touch sensor driver that transmits a second driving signal to the touch sensor and receives a second sensing signal from the touch sensor to generate touch data; and
a controller that generates a vertical blank signal that has an on-voltage during a vertical blank period and transmits the vertical blank signal to the fingerprint sensor driver,
wherein an off-voltage period of the vertical blank signal coincides with a first fingerprint driving period and a second fingerprint driving period, an on-voltage period of the vertical blank signal coincides with a third fingerprint driving period, and
the fingerprint sensor driver drives the fingerprint sensor once for each of the first fingerprint driving period, the second fingerprint driving period, and the third fingerprint driving period.

16. The display apparatus of claim 15, wherein a report rate of the fingerprint sensor driver is about 360 Hz.

17. The display apparatus of claim 15, further comprising:
a plurality of pixels disposed below the fingerprint sensor and the touch sensor; and
a display driver that controls light emission of the plurality of pixels,
wherein, when a frame rate of the display driver is a first value, a report rate of the fingerprint sensor driver is a second value that is three times the first value.

18. The display apparatus of claim 15, further comprising a plurality of signal lines that connect the fingerprint sensor to the fingerprint sensor driver, wherein the plurality of signal lines are included in a first conductive layer, and the plurality of first sensing electrodes, the plurality of third sensing electrodes, and the plurality of fourth sensing electrodes are included in a second conductive layer disposed on the first conductive layer.

19. The display apparatus of claim 18, wherein the first conductive layer includes a bridge pattern that connects third sensing electrodes of the plurality of third sensing electrodes that are adjacent to each other in a first direction, and the plurality of signal lines detour around the bridge pattern.

20. The display apparatus of claim 18, wherein the plurality of second sensing electrodes are included in the first conductive layer.

* * * * *